US012748935B2

(12) United States Patent
Attalla et al.

(10) Patent No.: US 12,748,935 B2
(45) **Date of Patent: *Sep. 29, 2026**

(54) GARMENT SORTING AND PROCESSING SYSTEM AND METHOD

(71) Applicant: Cintas Corporate Services, Inc., Mason, OH (US)

(72) Inventors: Tomas Attalla, Gallatin, TN (US); Gary Ernest Blattner, Plymouth, MN (US); Mark Andrew Bolen, Lebanon, OH (US); Robert Fulton Cotter, Batavia, OH (US); Chadwick A. Featherly, Inman, SC (US); Michael Lloyd Greenig, Bradenton, FL (US); Michael Lawrence Thompson, Harrison, OH (US)

(73) Assignee: Cintas Corporate Services, Inc., Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/277,931

(22) Filed: Jul. 23, 2025

(65) Prior Publication Data

US 2025/0348700 A1 Nov. 13, 2025

Related U.S. Application Data

(63) Continuation of application No. 18/616,495, filed on Mar. 26, 2024, now Pat. No. 12,393,804.

(Continued)

(51) Int. Cl.
*G06K 7/14* (2006.01)

(52) U.S. Cl.
CPC .................................. *G06K 7/1413* (2013.01)

(58) Field of Classification Search
CPC . G06K 7/1413; G06K 7/1417; G06K 7/10861

(Continued)

(56) References Cited

U.S. PATENT DOCUMENTS

| | | | |
|---|---|---|---|
| D309,255 | S | 7/1990 | Karow, Jr. |
| 5,407,109 | A | 4/1995 | Zuckerman |

(Continued)

FOREIGN PATENT DOCUMENTS

| | | |
|---|---|---|
| CZ | 28188 | 11/1998 |
| EM | 015091959-0001 | 2/2025 |

(Continued)

OTHER PUBLICATIONS

05801303TE Connectivity-Markers, posted date not available [online]; retrieved on Sep. 5, 2025 from https://www.tme.com/us/en-us/details/te-05801303/wire-markers/te-connectivity/05801303/; 2 pages.

(Continued)

*Primary Examiner* — Edwyn Labaze
(74) *Attorney, Agent, or Firm* — FBT Gibbons LLP

(57) ABSTRACT

A system and method utilizes a machine readable garment identification tag at a first station to enter information on the specific garment into a computer system. The garment data from the garment identification tag is assigned to a garment identifier which is printed or formed on a hanger neck sleeve member. The hanger neck sleeve member provides a consistent scan point through all the subsequent sorting stations in the system. This eliminates the need to search for the position of the garment tag to scan in sort stations subsequent to the initial station. Each hanger neck sleeve member has a machine readable code that is assigned to the associated garment and is placed on the neck of the hanger for that garment. The position of the hanger neck sleeve member on the neck of the hanger makes it readily accessible and readable.

18 Claims, 19 Drawing Sheets

Related U.S. Application Data

(60) Provisional application No. 63/454,980, filed on Mar. 28, 2023.

(58) Field of Classification Search
USPC .................... 235/462.01, 454, 375, 487, 439
See application file for complete search history.

(56) References Cited

U.S. PATENT DOCUMENTS

| | | | | | |
|---|---|---|---|---|---|
| 5,495,644 | A | | 3/1996 | Mesher et al. | |
| D411,439 | S | | 6/1999 | Jovanovich | |
| 5,964,354 | A | * | 10/1999 | Skinner | B07C 5/3412 198/465.4 |
| D506,620 | S | | 6/2005 | Leung et al. | |
| D507,120 | S | | 7/2005 | Leung et al. | |
| D510,019 | S | | 9/2005 | Davis | |
| 7,133,740 | B1 | * | 11/2006 | Stenson | G06Q 10/08 700/214 |
| D572,129 | S | | 7/2008 | Keays | |
| D658,049 | S | | 4/2012 | Boucher-Gagne et al. | |
| D756,211 | S | | 5/2016 | Downs | |
| 9,717,357 | B2 | * | 8/2017 | Johnson | A47G 25/1407 |
| D889,511 | S | | 7/2020 | O'Hare | |
| D953,196 | S | | 5/2022 | DeCosmo et al. | |
| 2015/0136814 | A1 | * | 5/2015 | Eden | A47G 25/1407 223/95 |
| 2018/0111165 | A1 | * | 4/2018 | Fanaian | B07C 5/3412 |
| 2018/0332990 | A1 | * | 11/2018 | Lawson | A47G 25/60 |
| 2019/0174940 | A1 | * | 6/2019 | Warren | A47G 25/1421 |
| 2024/0330627 | A1 | | 10/2024 | Attalla et al. | |

FOREIGN PATENT DOCUMENTS

| | | | | | |
|---|---|---|---|---|---|
| EM | 015091959-0002 | | | 2/2025 | |
| GB | 2075425 | | | 10/1998 | |
| GB | 2504059 | A | * | 1/2014 | A47G 25/1442 |
| KR | 101257908 | B1 | * | 4/2013 | A47G 25/1414 |
| KR | 20200101718 | A | * | 8/2020 | G06Q 20/322 |
| WO | WO-2017062643 | A1 | * | 4/2017 | G06K 19/0723 |
| WO | WO-2019096577 | A1 | * | 5/2019 | A47G 25/1407 |
| WO | WO-2020074907 | A1 | * | 4/2020 | A47G 25/1407 |

OTHER PUBLICATIONS

Wega Rounded Solenoid Cover, posted Oct. 17, 2021 [online], retrieved on Sep. 17, 2025 from https://web.archive.org/web/20211017133734/https://www.espressoparts.com/products/wega-rounded-solenoid-cover; 4 pages.

Custom Cheap Size Markers Clothes Clips, posted date not available [online], retrieved on Sep. 5, 2025 from https://www.alibaba.com/product-detail/Custom-Cheap-Size-Markers-Clothes-Clips_1600443077414.html?spm=a2700.7724857.0.0.632d182cgQBhDx; 3 pages.

* cited by examiner

FIG. 1 - PRIOR ART

GARMENT SORTING AND PROCESSING SYSTEM AND METHOD

REFERENCE TO RELATED APPLICATIONS

This application is a continuation of U.S. patent application Ser. No. 18/616,495, filed on Mar. 26, 2024, which claims benefit of U.S. Provisional Patent Application No. 63/454,980, filed on Mar. 28, 2023, and hereby incorporates each of these disclosures by reference herein in their entireties.

TECHNICAL FIELD

A system and associated method are provided for sorting articles suspended on hangers, and more particularly, to a system and associated method for sorting garments suspended on hangers and moving on a conveyor through a cleaning facility.

BACKGROUND

Commercial uniform rental laundering facilities handle numerous garments or articles of clothing and must be able to sort the garments once they have been washed and are ready to be delivered to the customer.

BRIEF DESCRIPTION OF THE DRAWINGS

Various embodiments will become better understood with regard to the following description, appended claims and accompanying drawings, wherein:

FIG. 1 is a front elevational view of a garment having a garment tag;

DETAILED DESCRIPTION

Figure 1A:
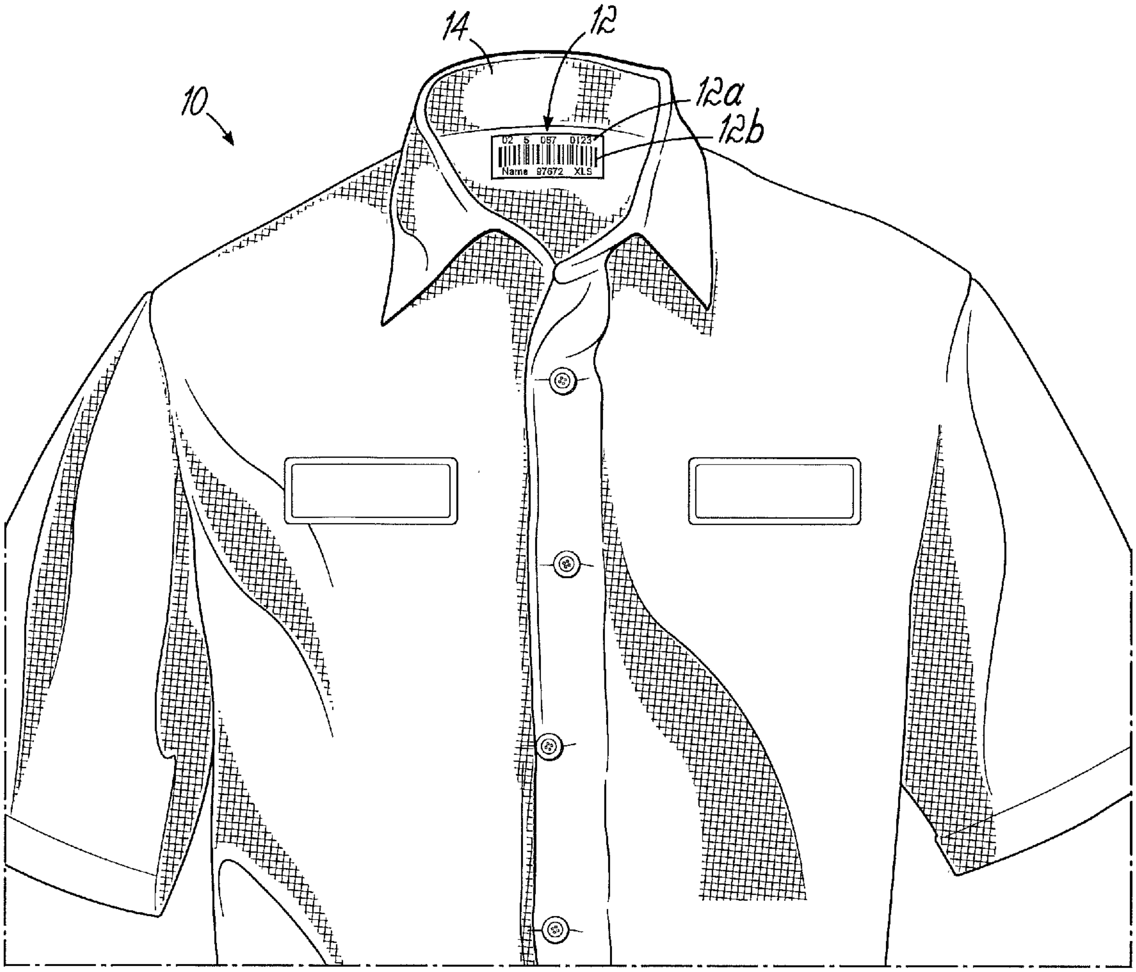
FIG. 1A is an enlarged view of a garment tag on a garment.

Typically, commercial facilities are required to label and sort the garments by delivery route, customer and user. The majority of laundries sort the laundry by hand. Automatic sorting machines are available for sorting garments which reduce the amount of required manpower. Sorting machines used for this purpose usually include a conveyor upon which hanger-supported garments are transferred. The conveyor carries the garments to various processing and sorting stations along the path of the conveyor. Each garment typically has a coded label which is detected or scanned by a detector. The code information is then conveyed to a computerized processor which controls automated sorting of the garment. Automated systems for removing the articles from the conveyor may be provided at each station. Using a bar code scanner, an operator manually scans the label for each garment into a computer. The code allows each article to be tracked by the computer as the article is moved along the conveyor so the computer can control the automated movement of the articles when the article passes the appropriate sorting station.

Conveyors used for sorting these various articles usually consist of a conveyor which has attachment members or hanger trees upon which the garments supported on clothes hangers are placed. Once the articles are placed on these attachment members, the conveyor carries the garments to various sorting stations along the path of the conveyor. Automated means for removing the articles from the conveyor are provided at each station so that the garments, which are identified with a particular route, customer or user, are collected at each station. The conveyor usually moves continuously with the garments being placed on the attachment members one at a time, each attachment member supporting one or more garments. To supply the conveyor with the garments to be sorted, an operator is usually required to feed each individual garment onto the attachment members of the conveyor. In most cases, an operator is also required to scan or input identification data for each garment into a computer at a number of sort stations along the conveyor route. This allows each article to be tracked by the computer as the article is moved along the conveyor so the computer can control the automated means for removing the articles when the article passes the appropriate sorting station.

Due to the large volume of garments that are to be sorted, the task of feeding and identifying the garments becomes quite repetitious. A human operator is often slow or inefficient in feeding the garments to the sorting conveyor.

Also, articles such as garments, are very difficult to identify and to achieve identification throughout the system so that effective sorting can be accomplished. This can be appreciated as the identity of a garment cannot simply be stamped on an outer visible surface thereof, but is often fixed at a location such as an inside cuff or collar, which is normally not readily visible. Also, when garments are hung on a conventional rail or conveyor, entanglement of either the garments or the garment hangers can frustrate the automatic identification and transport thereof.

A given facility must clean and process a wide variety of garments and the system must track each garment of every kind throughout the process. A few types of garments may be easily scanned for tracking throughout the system. However, difficulties abound when automated scanning of a vast variety of garments is required. The ability to locate an accessible machine readable tag on a wide variety of garments (i.e., pants, shorts, aprons, vests, overalls, dresses, coats, ponchos, shawls, etc. to name a few) is difficult in most instances and becomes almost insurmountable for an efficient reading process when the need for locating the machine readable tag in an inconspicuous location on the garment when it is in use is considered. For example, the placement of a tag 12 on a typical button down shirt 10 is commonly on the back, neck region below the collar 14 as shown in FIG. 1. This makes the garment tag 12 on such a shirt 10 readily viewable when the shirt 10 is on a hanger 16. Moreover, the tag 12 in this location is fully concealed when the shirt 10 is being worn. Other garments also present difficulties in this regard. For example, a tag may be placed on the interior waistband of a pair of pants or slacks. Such placement allows for concealment of the tag when the pants are being worn. However, access to the waistband tag for scanning or reading is difficult, if not impossible, when the pants are folded and suspended on a hanger. These complexities and difficulties are multiplied many times over when the process requires reading of each garment tag on a variety of garments at multiple locations throughout the system.

The present disclosure can address these and/or other shortcomings of the prior art. The present systems and methods can use a machine readable garment tag at a first station to enter information on the specific garment into the computer system. An output can be provided to a digital display/monitor showing sortation operators where to place the garment on the hanger in a manual sort conveyor. This can accordingly reduce or remove reliance on operators reading the human readable data on a barcode. It can also eliminate the need to have human readable data on the garment tag in addition to the machine readable code or barcode. The initial scan of the garment tag or barcode at the initial sort-hanging station can also provides other benefits. The garment barcode data can be assigned to a system barcode which is printed or formed on a hanger neck sleeve member. The hanger neck sleeve member can provide a consistent barcode scan point through all the subsequent sorting stations in the system. This can eliminate the need to search for the position of the garment tag to scan in sort stations subsequent to the initial station. Each hanger neck sleeve member can have a machine readable code that is assigned to the associated garment and is placed on the neck of the hanger for that garment. The position of the hanger neck sleeve member on the neck of the hanger makes it readily accessible and readable, significantly more so than the garment tag in these regards. The machine readable code on the hanger neck sleeve can be read at each required station after it is applied to the hanger to track the movement of the garment on that hanger. The hanger neck sleeve members can be removed from the associated hangers after the final sorting station and their system machine readable code data barcode can be cleared from the system for subsequent re-use/re-assignment to another garment at the initial station. In accordance with one embodiment, the digital output from the initial sorting station can be used to instruct a robot or other non-human operator where to put the identified garment in the second and/or subsequent sorting stations. This method can accordingly reduce the quantity of human operators in second and subsequent sort areas.

FIG. 1 illustrates a garment 10 which may be cleaned, sorted and/or processed according to various embodiments of the present disclosure. The garment 10 has a garment tag 12 which in the shirt garment 10 of FIG. 1 is located below a collar 14 and on a back, neck region of the garment 10. Advantageously, the placement of the garment tag 12 on this particular embodiment of the garment 10 allows for both prominent presentation of the garment tag 12 during cleaning, sorting and/or processing within a facility according to the present disclosure, but concealment of the garment tag 12 when the garment 10 is in use and/or being worn. It should be understood that a sorting, processing and/or cleaning system according to the present disclosure can be applicable to a wide variety of garments 10, including, but not limited to, the shirt shown in FIG. 1 and vast variety of garments of other designs, sizes and construction.

Figure 1A:
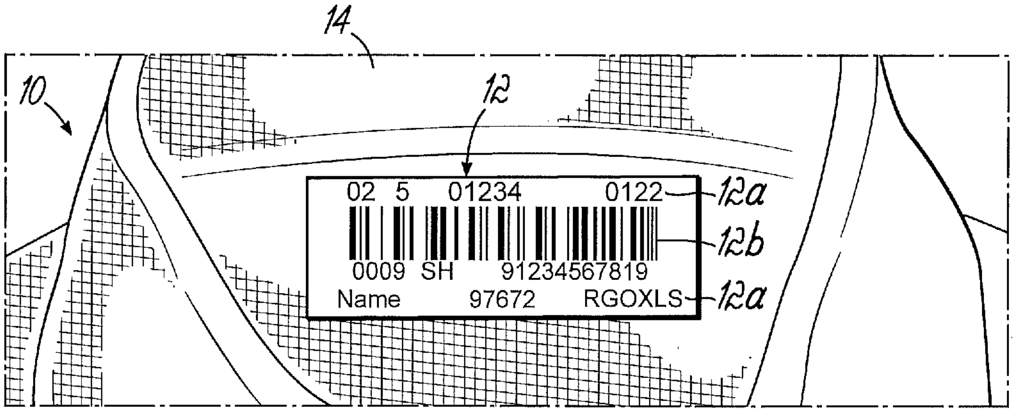

As shown in FIGS. 1 and 1A, the garment tag 12 may have a variety of information, some of which may be machine readable and some of which may be human readable. The garment tag 12 of FIGS. 1-1A includes indicium wherein the indicium includes identification data to uniquely identify the associated garment. The indicium can be unique in the system such that no two of the plurality of indicium in the system has the same identification data. A field 12*a* of human readable information may include route, customer and user information. The garment tag 12 may also have a field 12*b* of machine readable information such as a bar code, QR code, optical character recognizable data, combinations thereof or other types. The present teachings are not limited to any particular type of machine readable information.

Figure 2:
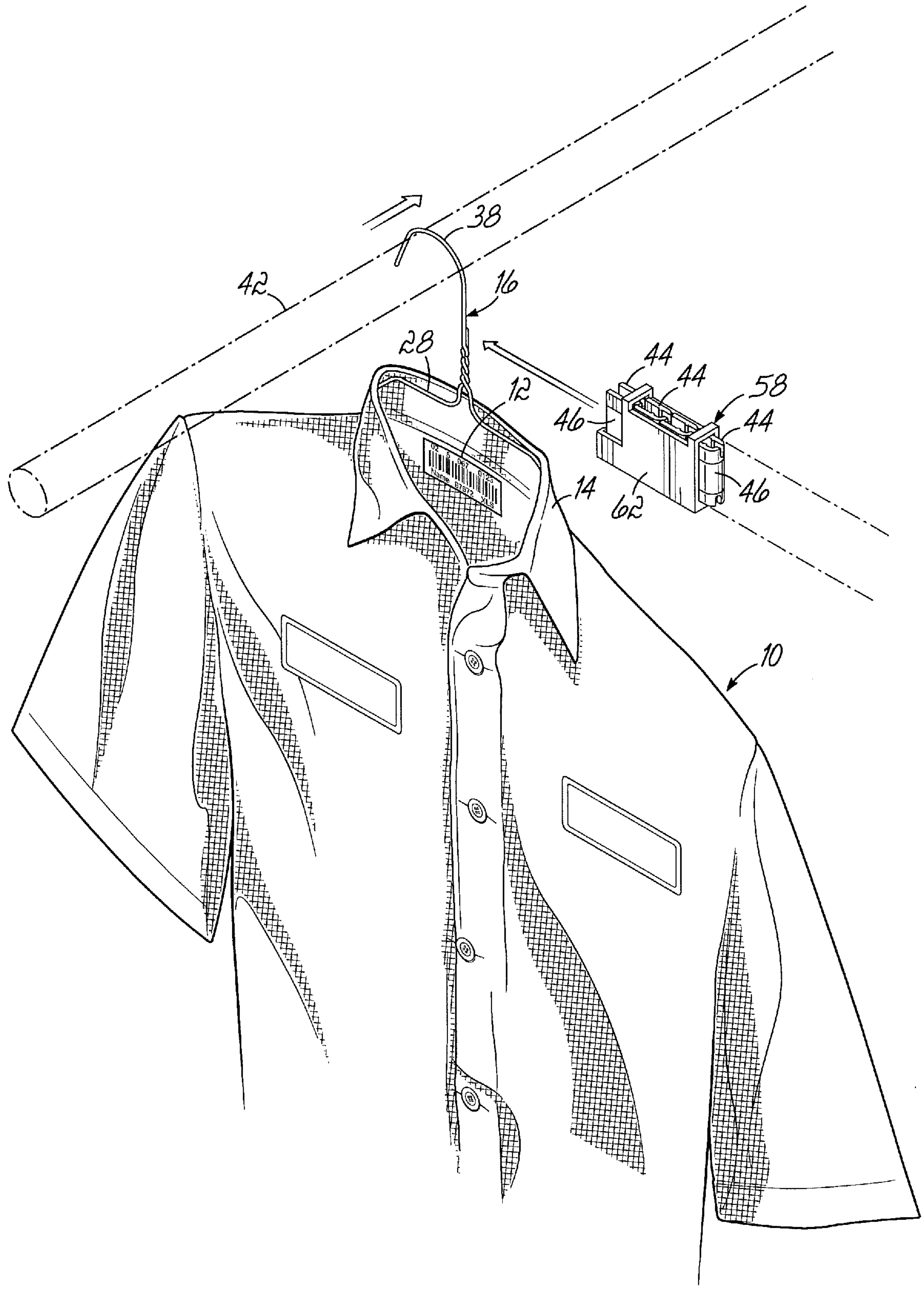
FIG. 2 is a perspective view of a garment on a hanger moving along a conveyor system and having a garment identification member in the form of a hanger neck sleeve member being applied to the neck of the hanger from a cartridge containing a number of such hanger neck sleeve members according to one embodiment.
Figure 3:
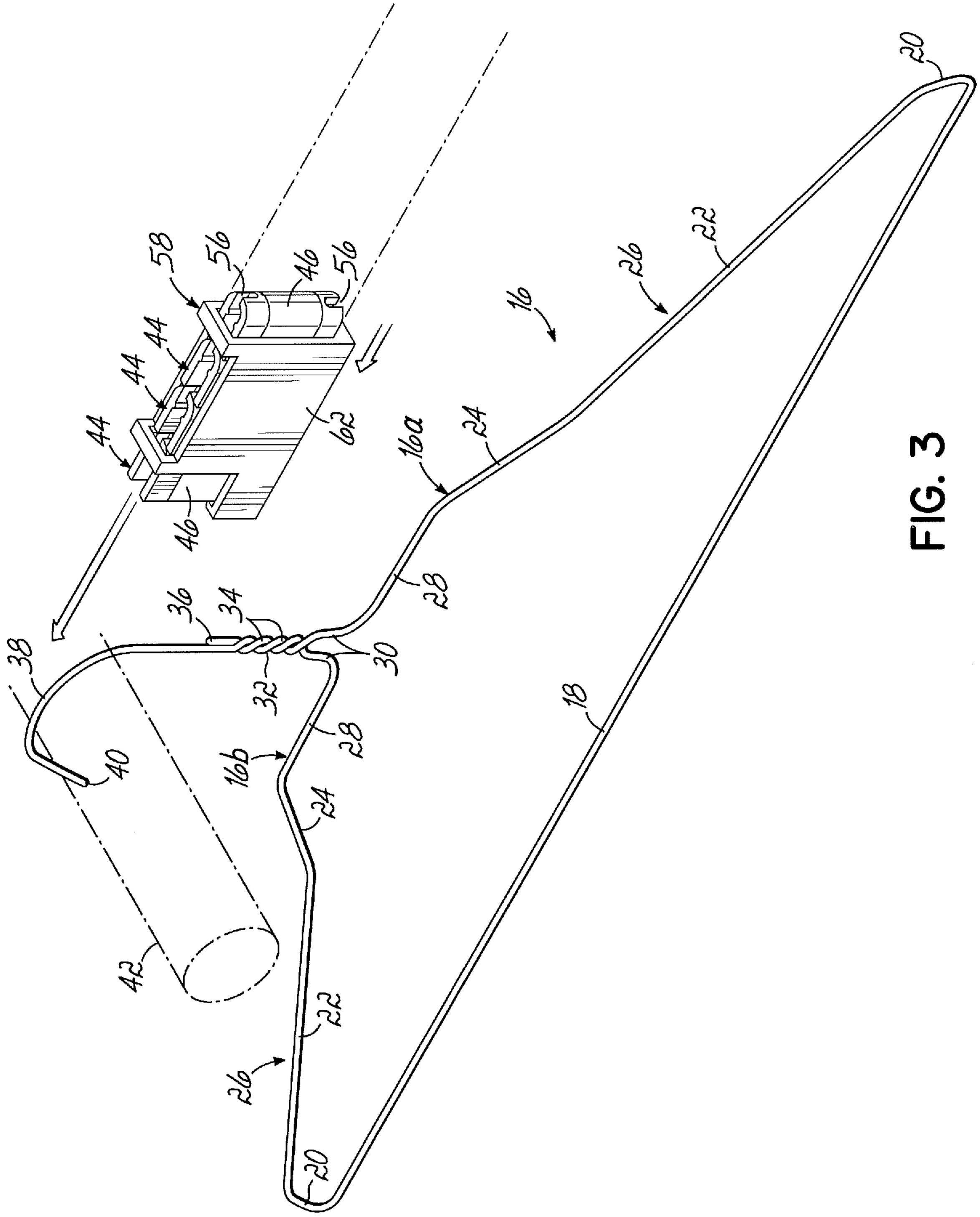
FIG. 3 is an enlarged perspective view of the leading hanger neck sleeve member in the cartridge being applied to the neck of the hanger.
Figure 4A:
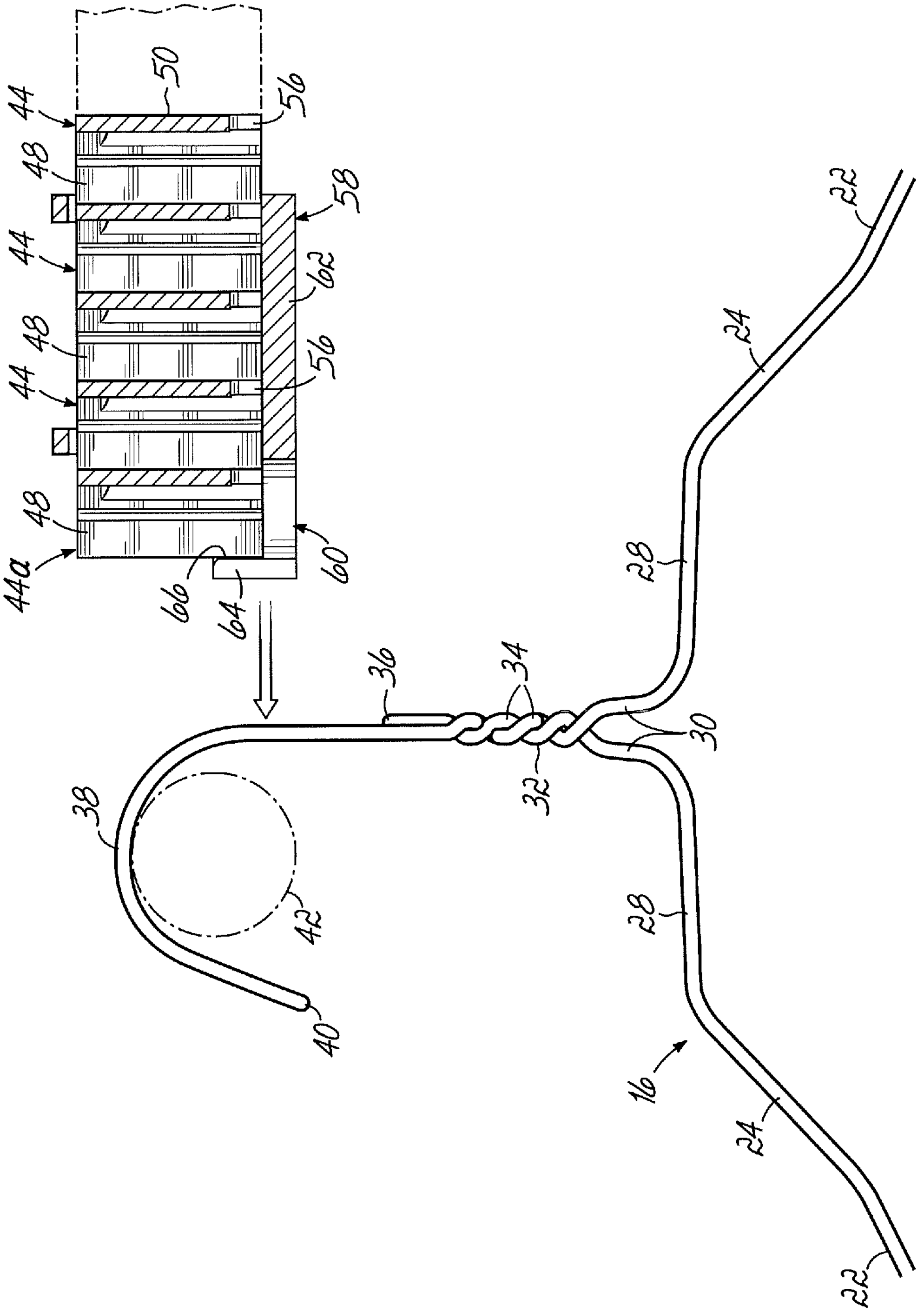
FIGS. 4A-4E are sequential front elevational views of the hanger neck sleeve member being applied to the hanger neck according to one embodiment.
Figure 4B:
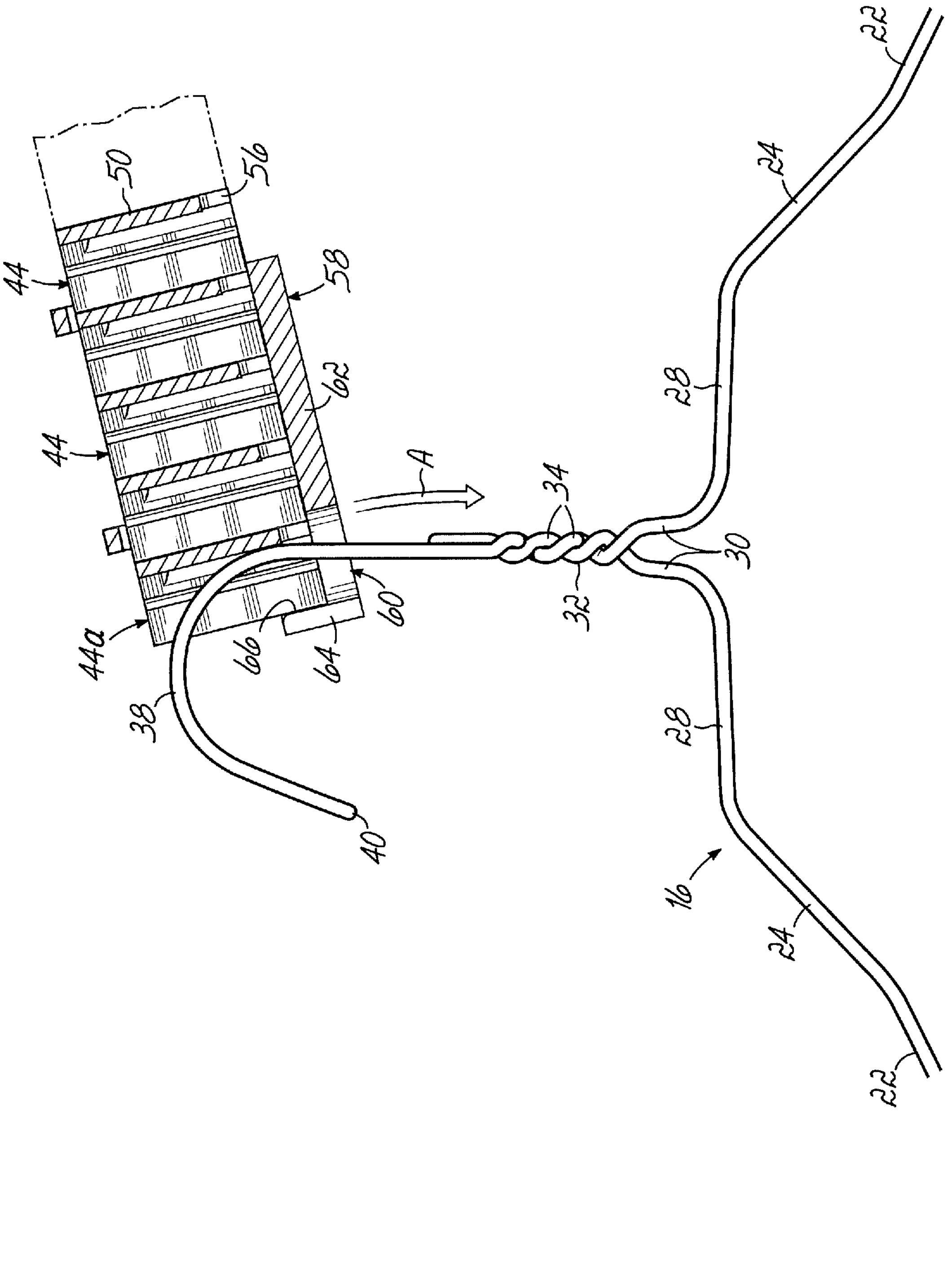
Figure 4C:
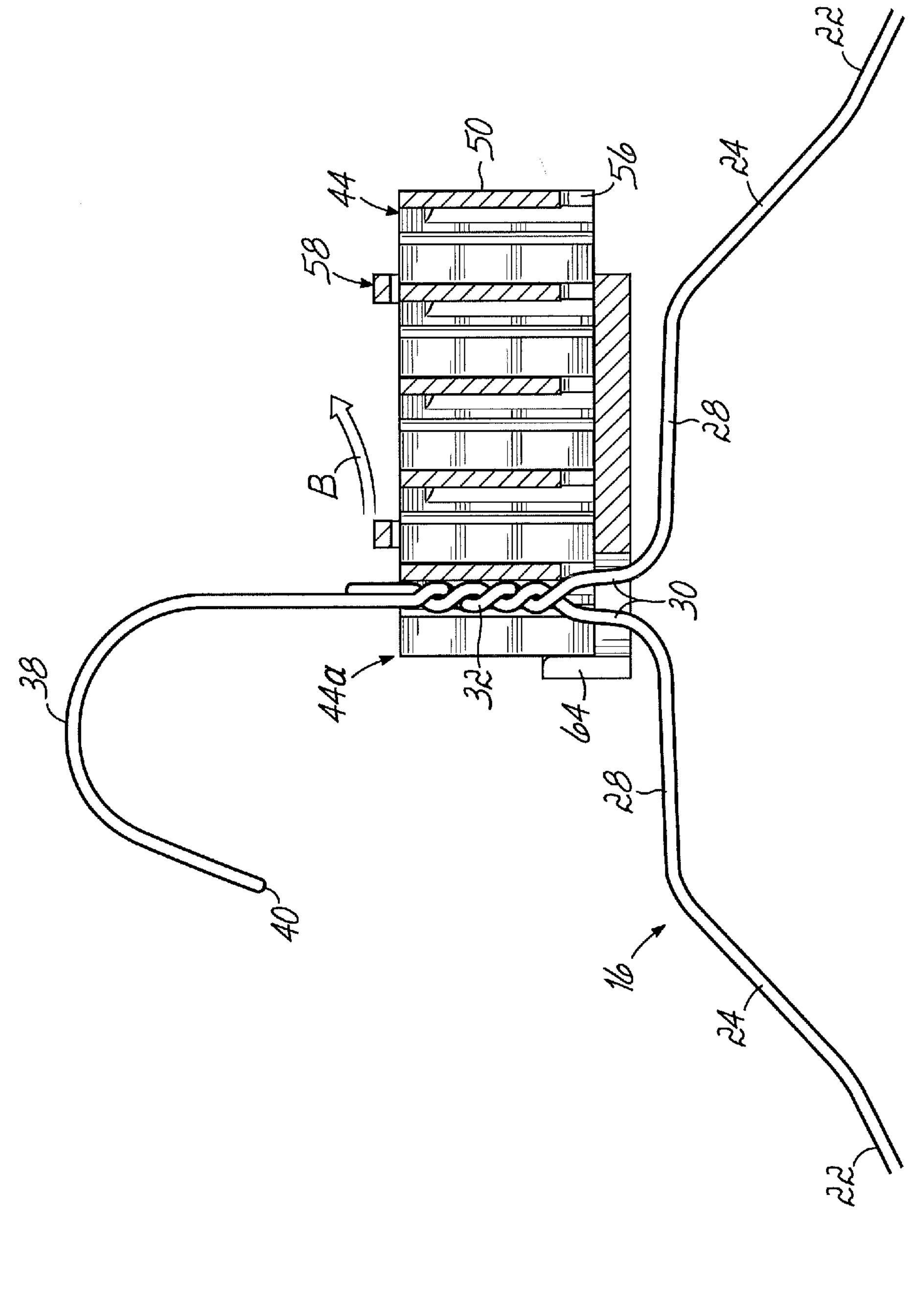
Figure 4D:
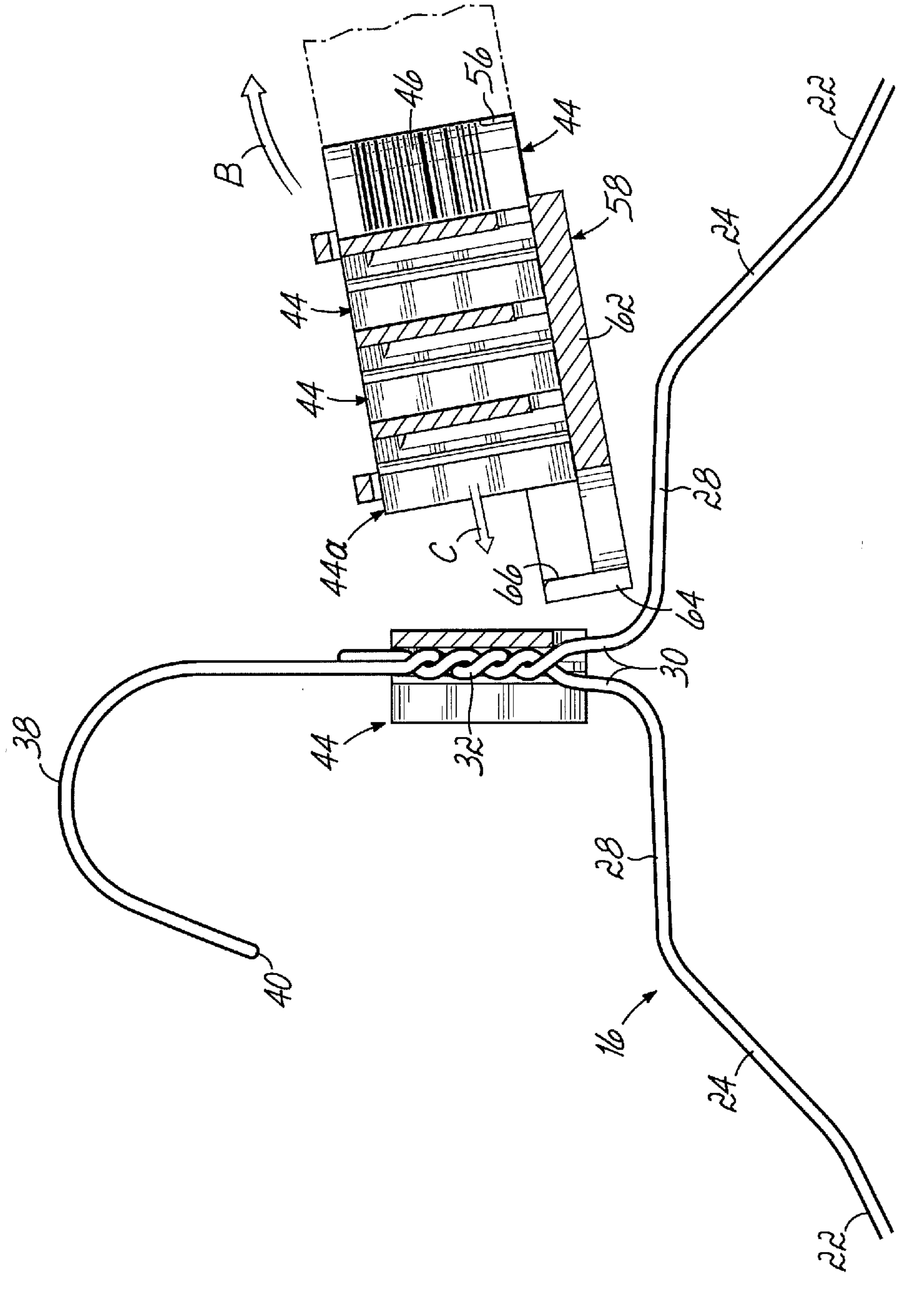

Industrial facilities for sorting, processing and/or cleaning garments 10 can suspend the garments 10 on a hanger 16 as shown in FIGS. 2-3. The hanger 16 shown herein is a wire hanger 16, but any design, style, shape, size or construction of garment hanger 16 may be utilized in accordance with the present disclosure. The wire hanger 16 as shown most clearly in FIG. 3 is formed from a single piece of wire and has a linear crossbar 18, which may be omitted in some hanger 16 designs. The crossbar 18 terminates at opposite ends thereof in one of two bends 20. A shoulder 22 projects from each bend 20 opposite from the crossbar 18. A brace 24 projects from the shoulder 22 on each arm 26 of the wire hanger 16. The brace 24 is joined to a cross-stem 28 which is generally parallel to the crossbar 18 in many wire hanger 16 embodiments. A neck region including a neck 30 extends upwardly from each cross-stem 28 and the two necks 30 are joined together at a twisted joint 32 oriented generally perpendicular to the crossbar 18. At the twisted joint 32, the wire of each arm 26 forms a number of revolutions 34 about each other. The wires of each neck 30 are offset from each other as they enter the twisted joint 32. A terminal end 36 of the wire of one arm 26 is shown to project upwardly from the twisted joint 32 and the wire of the other arm 26 is shown to be bent into a hook 38 and terminates at a terminal hook end 40. The necks 30 and twisted joint 32 may be considered a neck region of the hanger 16 with or without adjacent components. The hook 38 is adapted to suspend the hanger 16 and garment 10 on a bar 42 (FIGS. 2, 3 and 4A) or conveyor system as will be discussed hereinbelow.

A garment identification member can be unique to each garment 10 and embodiments of the garment identification member are shown in FIGS. 2-6 as a hanger neck sleeve member 44 which is clipped or mounted onto the hanger 16 proximate the neck 30 and twisted joint 32 region of the hanger 16. Each hanger neck sleeve member 44 includes a tag or indicium 46 which is prominently visible when the member 44 is mounted on the hanger 16 for being read by a scanner or reader. The tag 46 may include machine readable data which when scanned or read serves to identify the garment 10 on the hanger 16 on which the particular member 44 is mounted. The indicium 46 on each of the members 44 bears identification data to uniquely identify the associated garment 10 on the associated hanger 16. Each indicium 46 can be unique in the system such that no two of the indicium 46 in the system bear the same identification data.

Figure 3B:
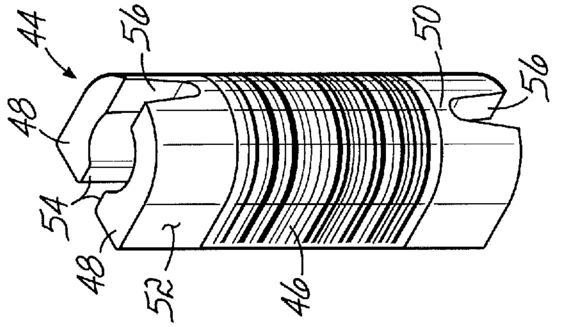
FIGS. 3A-3B are perspective views of hanger neck sleeve members.
Figure 3A:
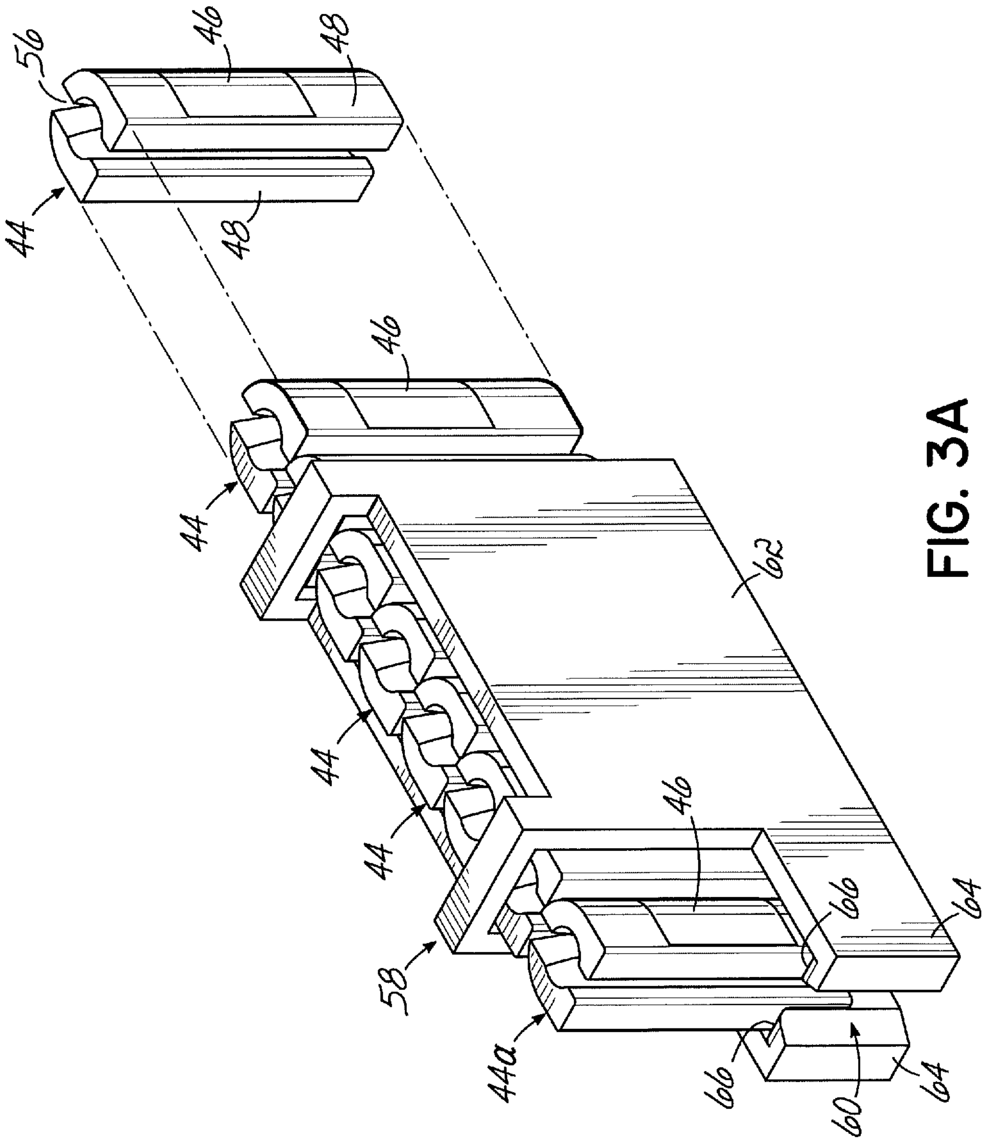
Figure 5A:
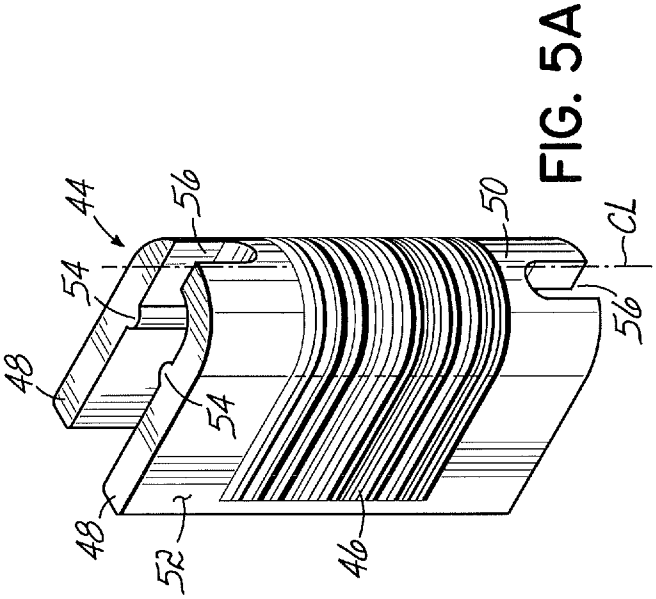
FIG. 5A is an enlarged view of the hanger neck sleeve member of FIG. 5.
Figure 6:
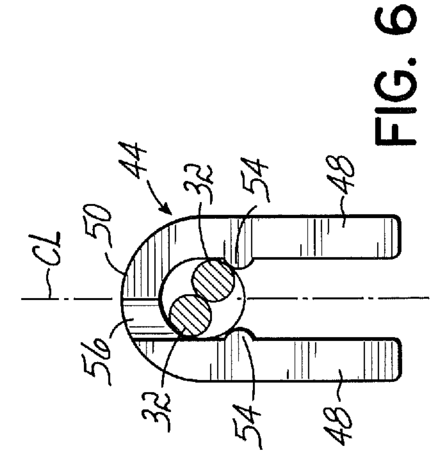
FIG. 6 is a cross-sectional view taken along line 6-6 of FIG. 5.
Figure 5:
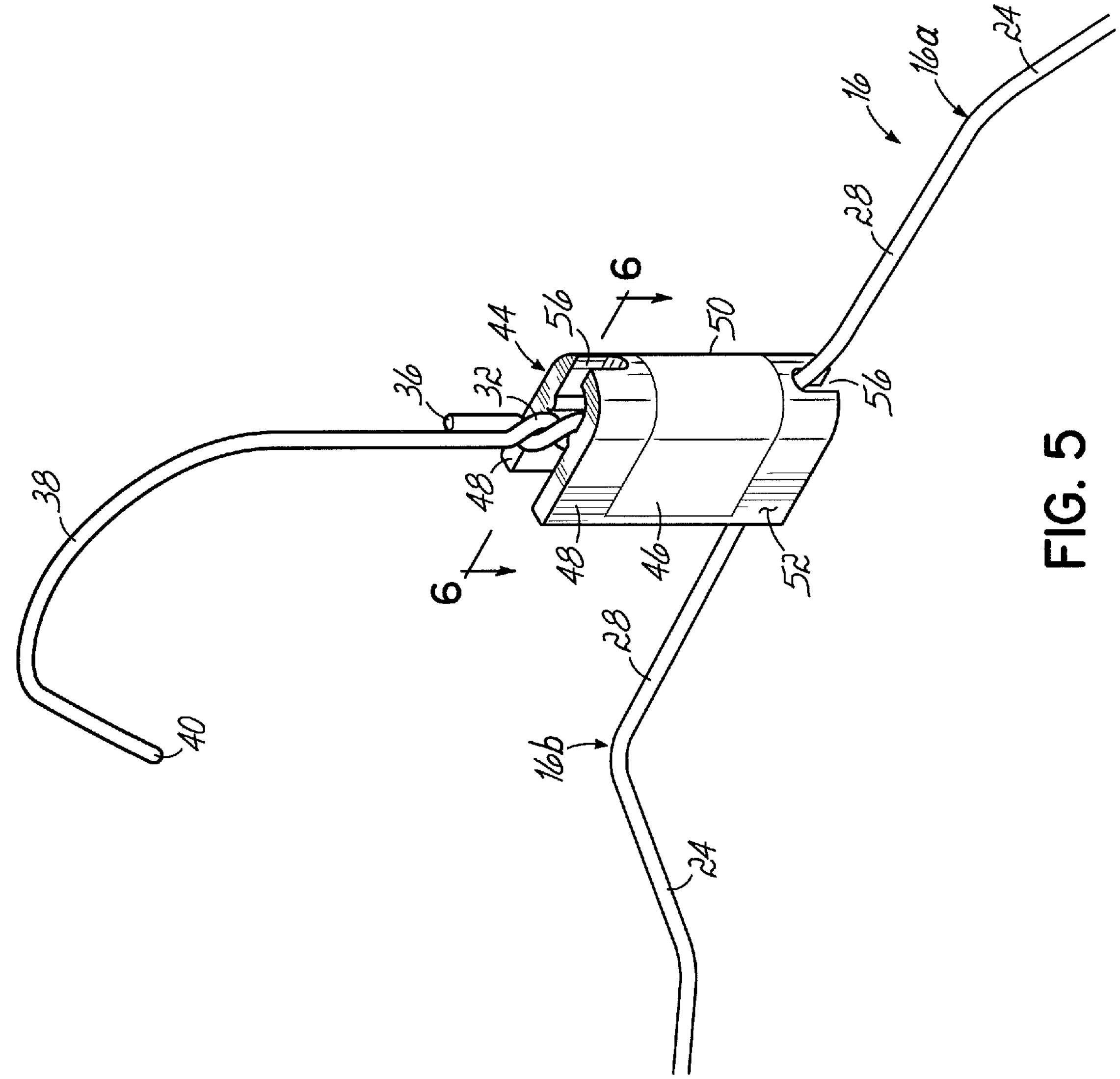
FIG. 5 is an enlarged perspective view of the hanger neck sleeve installed on the hanger neck.
Figure 7:
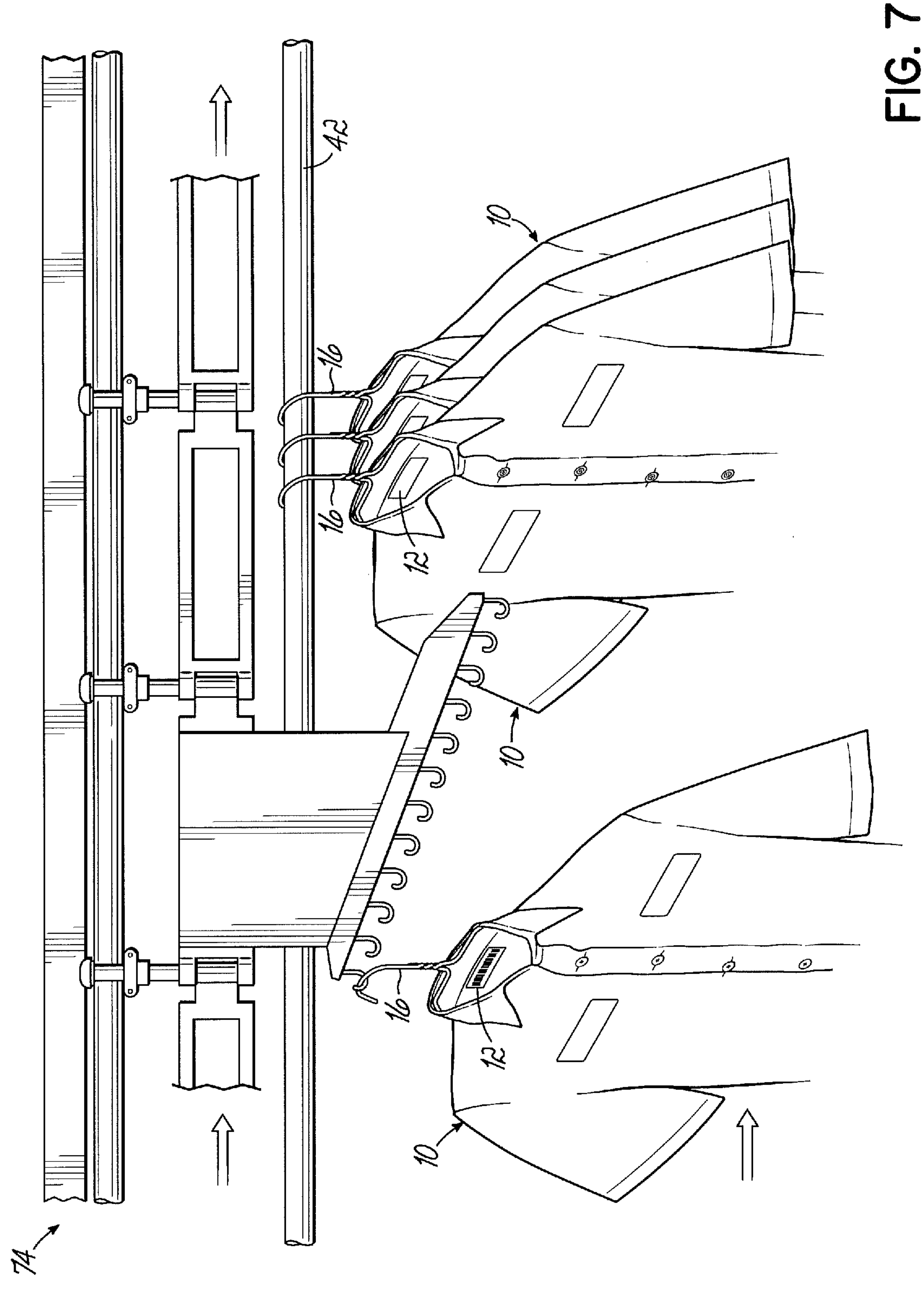
FIG. 7 is a perspective view of a garment conveyor system in accordance with one embodiment.

Each hanger neck sleeve member 44 can have a generally U-shaped cross-section as can be seen in FIGS. 3A, 3B and 6. The member 44 according to one embodiment has a channel shaped configuration with a pair of spaced member flanges 48 generally parallel to each other and joined together at an arcuate bight portion 50 of the member 44. The flanges 48 in the embodiment of FIGS. 3A-3B are shorter than that of FIG. 6. An outer face 52 of the member 44 includes the outer faces of the flanges 48 and the outer face of the bight portion 50 and the tag 46 may be located on the outer face 52 of the member 44, as shown in FIGS. 3B and 5A. A rib 54 may be formed longitudinally on an inner face of each flange 48 proximate the bight portion 50. A pair of notches 56 are formed in opposite ends of the member 44 proximate the juncture of the flanges 48 and bight portion 50. The notches 56 are offset from one another as shown in FIGS. 3B and 5-5A such that one notch 56 is at the juncture of one flange 48 and the bight portion 50 and the other notch 56 on the opposite end of the member 44 is at the juncture of the other flange 48 and the bight portion 50. In various embodiments, the member 44 may be made of a durable polycarbonate or plastic material and/or may be produced by additive manufacturing. The tag 46 may be adhesively applied to the member 44 or permanently etched or formed on the outer face 52.

When mounted onto the hanger 16, the hanger neck sleeve member 44 snaps around the twisted joint 32 with the ribs 54 capturing the wire of the twisted joint 32 adjacent to the bight portion 50 as shown in FIG. 6. The notch 56 at the lower end of the member is seated on the neck 30 of the hanger 16 adjacent to the cross stem 28 as shown in FIG. 5. When the member 44 is mounted to the hanger 16 as in FIG. 5, the member tag 46 is prominently displayed and presented for scanning or reading without interference from the garment 10 on the hanger 16.

As shown in FIGS. 2-4E, a supply of hanger neck sleeve members 44 may be contained in a dispensing clip or cartridge 58 and the supply of members 44 may be biased or spring loaded in the cartridge 58 to urge a leading member 44*a* in the cartridge 58 toward a mouth 60 of the cartridge 58 so that the leading member 44*a* may be discharged from the cartridge 58 and attached to the hanger 16. The cartridge 58 according to one embodiment has an open top housing 62 to contain the supply of members 44 and the leading member 44*a* may be discharged from the mouth 60 of the cartridge 58 from between a pair of jaws 64 each with an inwardly directed detent 66 as shown in FIGS. 3 and 3A.

Figure 4E:
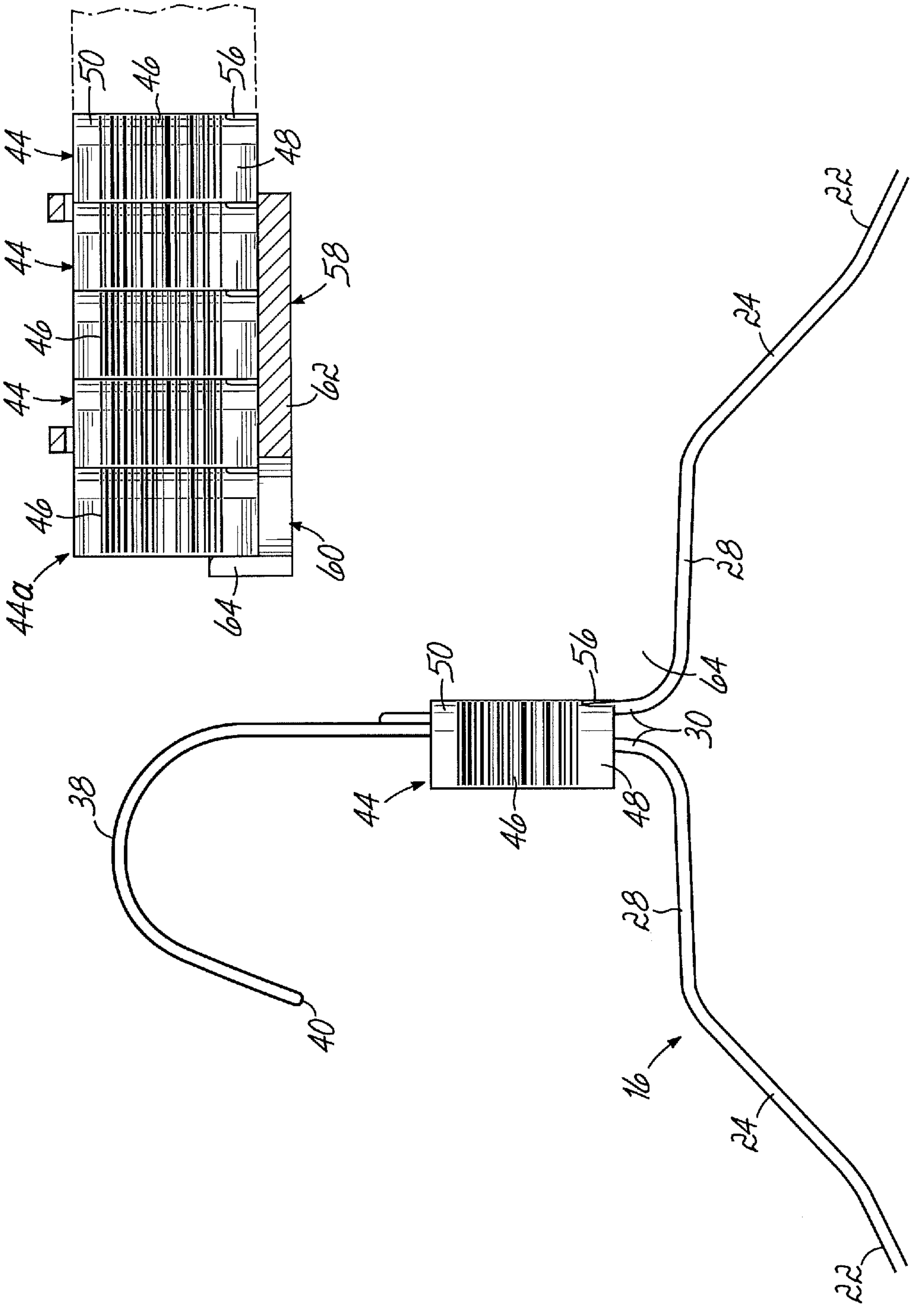

One sequence for mounting the member 44 to the hanger 16 with the cartridge 58 is shown in FIGS. 3-4E. The hanger 16 may have a garment 10 suspended on it and the hook 38 of the hanger 16 may suspend the hanger 16 and garment 10 from the bar 42 or similar arrangement. The member 44 may also be mounted to a hanger 16 before a garment 10 is suspended from the hanger 16. The cartridge 58 with a leading member 44*a* positioned in the mouth 60 thereof approaches the hanger 16 as seen in FIGS. 4B and 4F. The wire of the hanger 16 adjacent to the hook 38 is inserted into the leading member 44*a* between the jaws 64 of the cartridge 58. The flanges 48 of the member 44*a* are positioned on either side of the wire with the wire therebetween (FIGS. 4B and 4G). The cartridge 58 and leading member 44*a* are then shifted downwardly in the direction of arrow A in FIG. 4B such that the member 44*a* approaches the twisted joint 32 of the hanger 16. Continued downward movement of the cartridge 58 relative to the hanger 16 positions the leading member 44*a* on the twisted joint 32 or neck region of the hanger 16. Then the cartridge 58 is moved away from the hanger 16 in the direction of arrows B in FIGS. 4C and 4D thereby leaving the member 44 mounted on the hanger 16. The rib 54 within the member 44 serves to retain the member 44 on the twisted joint 32 of the hanger 16 as the cartridge 58 and remaining members 44 move away from the hanger 16. Once the leading member 44*a* is discharged from the cartridge 58, the next member 44 is urged forwardly in the direction of arrow C in FIG. 4D into the mouth 60 of the cartridge to become the next leading member 44*a*. As such, the member 44 is securely and releasably mounted onto the hanger 16 with the tag 46 prominently displayed on the hanger 16 without interference or obstruction by the garment 10 suspended on the hanger 16.

Referring to FIG. 5, the lower notch 56 of the member 44 is seated onto the wire of the hanger 16 between the cross-stem 28 and neck 30 in one embodiment. The lower notch 56 is offset from a longitudinal centerline CL at the bight 50 of the member 44 to be positioned on the wire because the neck 30 on one arm 16*a* is offset from the wire at the neck 30 of the other arm 16*b* of the hanger 16 below the twisted joint 32. This juxtaposition of the wire in the arms 16*a*, 16*b* proximate the twisted joint 32 is shown also in the cross-sectional view of FIG. 6.

Figure 12:
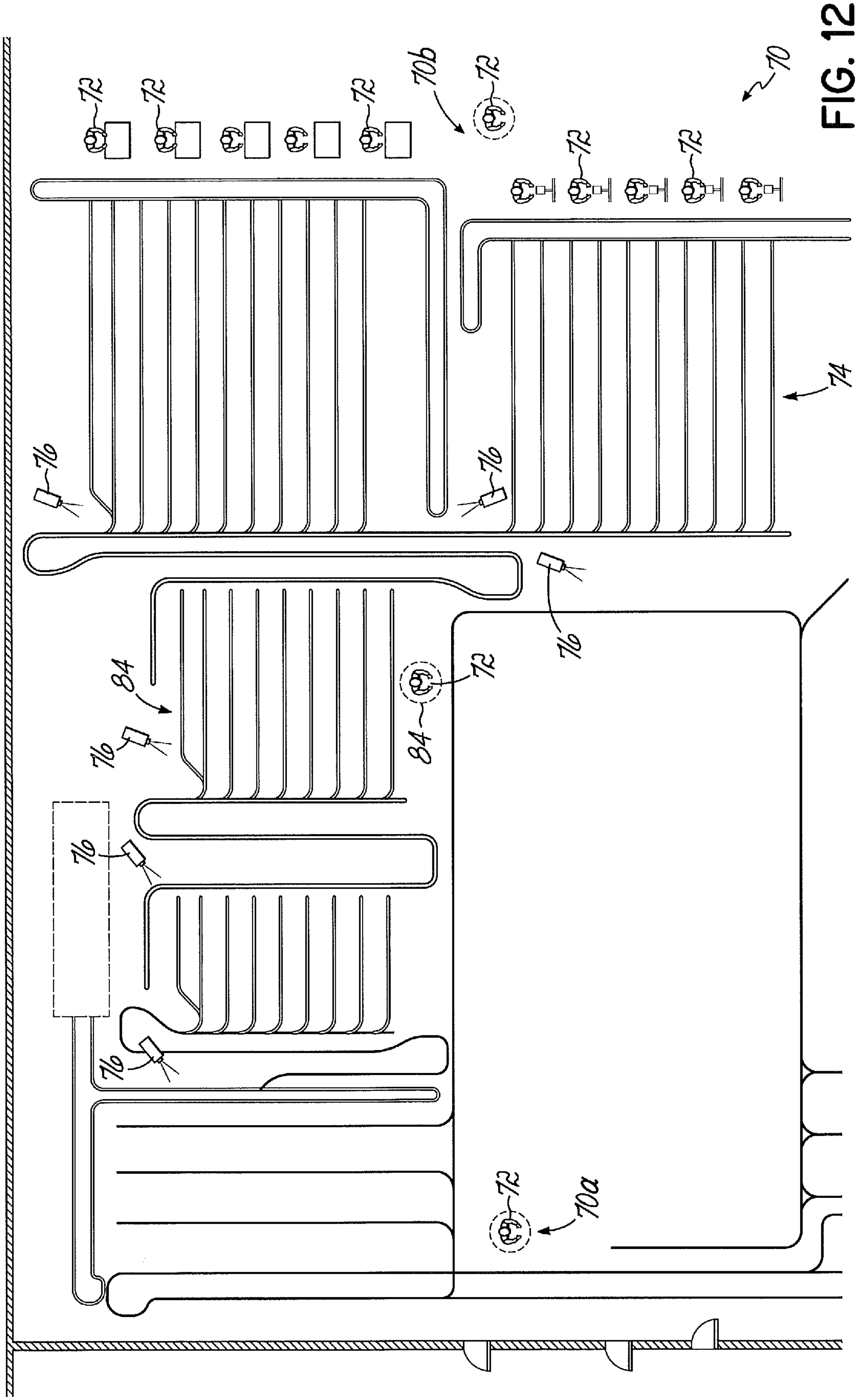
FIGS. 12-13 are top plan views of sorting and process facilities utilizing fewer human operators in accordance with embodiments of the present disclosure for operation of the facility.
Figure 13:
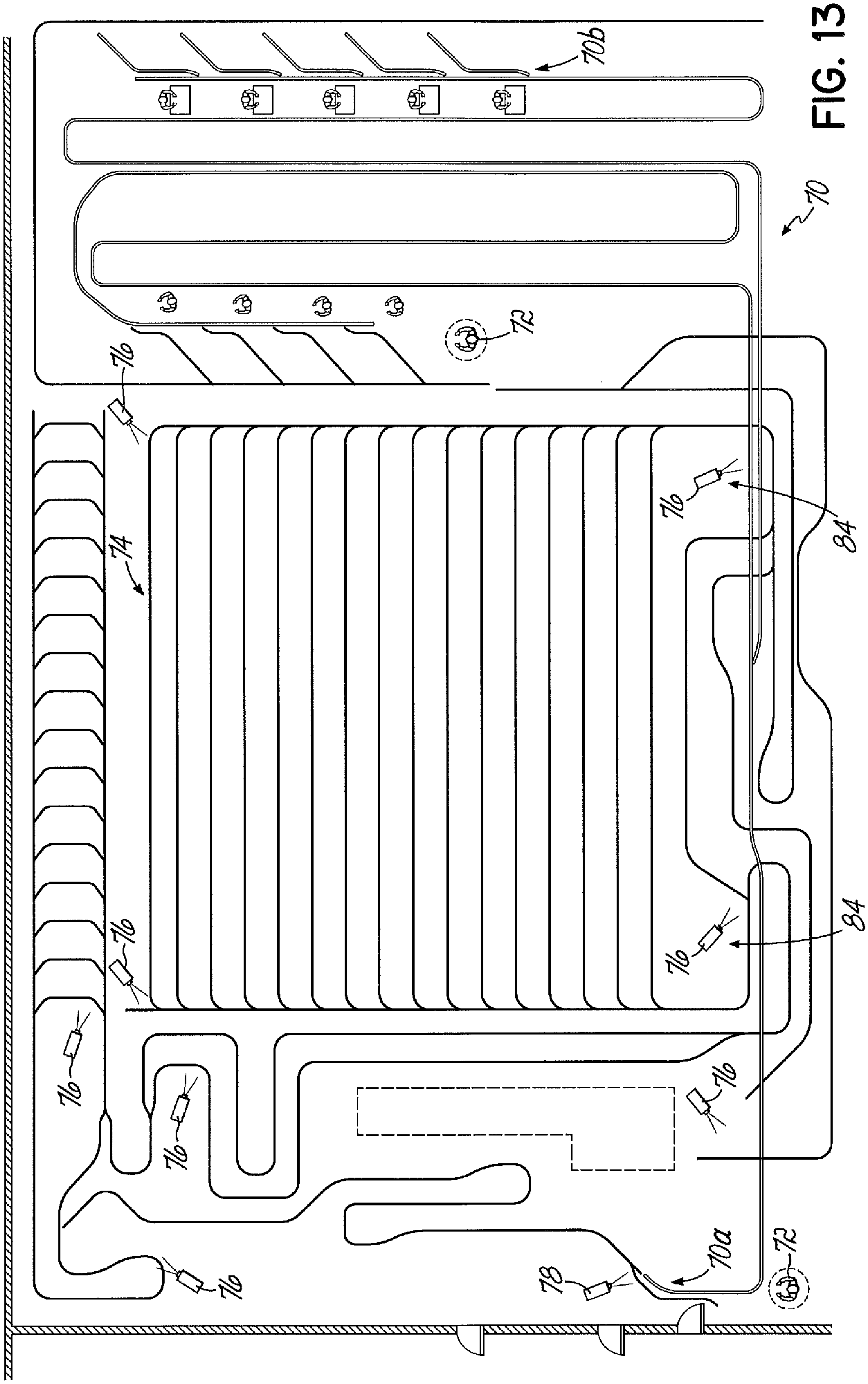

Selected embodiments of cleaning, sorting or processing systems 70 with the benefit of the present disclosure are shown in FIGS. 12-13 in which each hanger 16 with the associated garment 10 has a hanger neck sleeve member 44 mounted thereon. The members 44 on each hanger 16 in the system 70 allows for the reading of the tag 46 on the member 44 by a bar code reader 76 at specific locations within the system 70 thereby eliminating many of the operators 72 within the system 70. The system 70 of FIG. 12 utilizes only three operators 72 while the system of FIG. 13 utilizes only two operators 72 because the readers 76 at various positions throughout the system 70 read the tags 46 on the members 44 in a more reliable, efficient, consistent and accurate manner than operators 72 reading the garment tags 12 as with the prior art. Locations of the readers 76 are shown in FIGS. 12-13, but other locations, quantities and specifics of the readers 76 are encompassed within the scope of the present disclosure. The tags 46 on the members 44 and the readers 76 for such tags 46 are shown and described in various embodiments herein as employing bar code technology, but other machine readable or detecting technologies (i.e., QR, RFID, for example) may be likewise utilized with other embodiments hereof.

In one embodiment, a single scan of garment barcode 12 at the initial sort-hanging station 70*a* inputs that information into a computer database 80 for the facility 70 which is assigned to a system barcode and printed or formed on an the hanger neck sleeve member 44 tag 46. The tag 46 on the member 44 suspended on the hanger 16 of the garment 10 provides a consistent barcode scan point through all the garment sorting stations in the system 70. In accordance with the present teachings, the need can be eliminated to search for the position of the garment tag/barcode 12 to scan in sort stations subsequent to the initial sort-hanging station 70*a*. The members 44 are removed after final sort station 70*b* and their system barcode is cleared for fresh re-use/re-assignment at the first sorting station 70*a* for subsequent garments 10. Several thousand members may be used in a single facility 70 in various embodiments.

Figure 8:
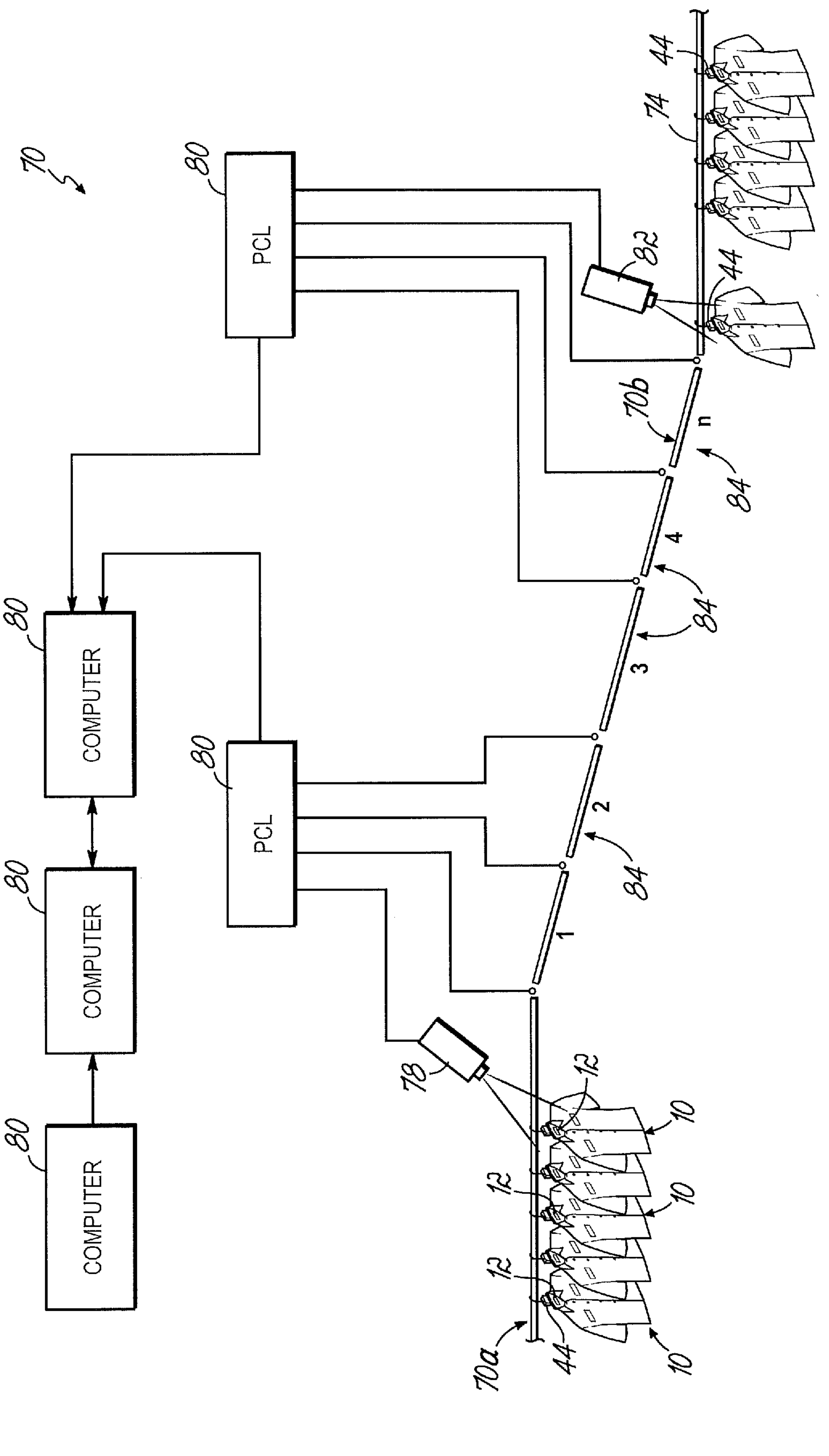
FIG. 8 is a schematic view of a sorting and processing facility in accordance with one embodiment.

FIG. 8 illustrates a sorting and processing system/facility 70 in accordance with one embodiment wherein the conveyor 74 is shown with unsorted hanger-suspended garments 10 proximate the starting location 70*a*. A number of sorting stations 1-*n* and an outlet conveyor 74 proximate the discharge location 70*b* for sorted garments 10 processed and to be delivered to a customer. Note that in this schematic facility each of the sorting stations 1-*n* is arranged in series while other arrangements are also possible and within the scope hereof.

The unsorted hanger-suspended clothing 10 is carried by the conveyor 70, e.g. a horizontal screw-conveyor in one embodiment, past an initial upstream reader or registration device 78 proximate the starting location 70*a* where, e.g., a camera, sensor or reading device scans the code on the garment tag 12 on the garment 10 and the tag 46 on the member 44 mounted on the associated hanger 16 at or near the first sorting section 70*a*. The specific garment tag 12 is associated with the tag 46 on the associated member 44 mounted on the hanger 16 in a computer system 80 for the facility/system 70. Therefore, each subsequent time and location the tag 46 is read by a reader 76 in the system 70, the specific details for that garment 10 are associated with the tags 12 and 46. The garment tag 12 does not need to be read after the first registration device 78 because the tag 46 on the member 44 is easily read. From here, the garment 10 is carried through the subsequent sorting stations 1 thru n and led away by means of an outlet conveyor 74*b*, which may also be a horizontal screw-conveyor. The garments 10 are sorted correctly and appropriately based on the reading of the tag 46 on the hanger neck sleeve member 44. For a possible post-checking of the sorting, a scanning device 82 for the identification of the garments 10 may be placed proximate the outlet conveyor 74*b*.

Depending on the size of the facility 70, the sorting sections are controlled by one or more electronic circuits 19, each of which comprises a PLC, possibly connected to the computer 80, and input and output circuits which are coupled to the scanning/reading devices 76, 78, 82, to the sorting stations 1, 2, . . . n and to the driving aggregates for the conveyor 74.

The system 70 can also include a computer 80 which is coupled to a database in which the production programs are generated, e.g. for one day, in that the actual data are retrieved from the database. When it is required, a daily program consisting of a number of codes, for example a number of line codes in the desired sequence, can be transferred to the machine control which, for example, comprises a further computer which handles the amount of data for the day. The relevant data are collected and sent further to the actual machine control, which comprises one or more electronic circuits 19 coupled directly to the system 70 and placed on or in the vicinity thereof. These electronic circuits control the inputs to and outputs from the facility itself, and ensure that the whole of the sorting is affected in the manner as prescribed in the database and in the daily programs for each customer with regard to the sequence of the articles, their size, color, number and so on. The garment tags 12 for the garments 10 are associated with the tag 46 on the member 44 mounted on the associated hanger 16 in the computer database.

Once the garment 10 on the hanger 16 approaches the facility exit, the member 44 may be removed from the hanger 16 and its association with the garment 10 may be erased from the computer database for subsequent re-use of the member 44 and tag 46.

Figure 9:
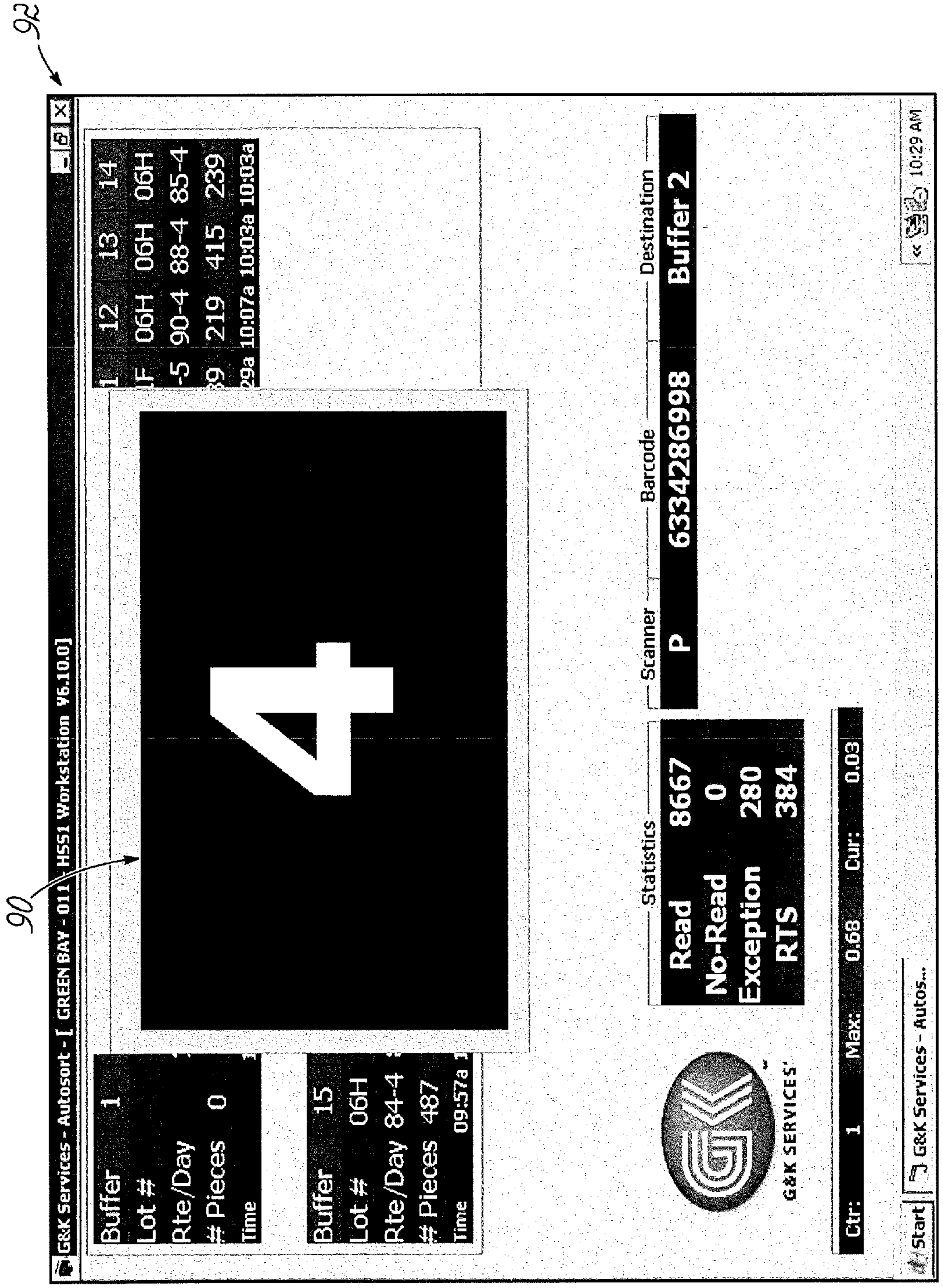
FIG. 9 is a view of a screen at an initial sorting station of various embodiments indicating where a particular garment should be placed based on its garment tag data.

In FIG. 9, a computer assisted program uses barcode reader input at each sort station 84. The program provides an output message 90 to a digital display/monitor 92 showing an operator where to place the specific garment 10 suspended on the hanger 16 on a manual sort conveyor 74. The garment tag 12 is read by a barcode reader 76 and the sorting program determines where the garment 10 is to be placed by the operator on the conveyor 74. This operation removes reliance on operators reading the human readable data 12*a* on the garment tag 12. This can eliminate the need to have human readable data 12*a* on the garment tag 12.

Figure 10:
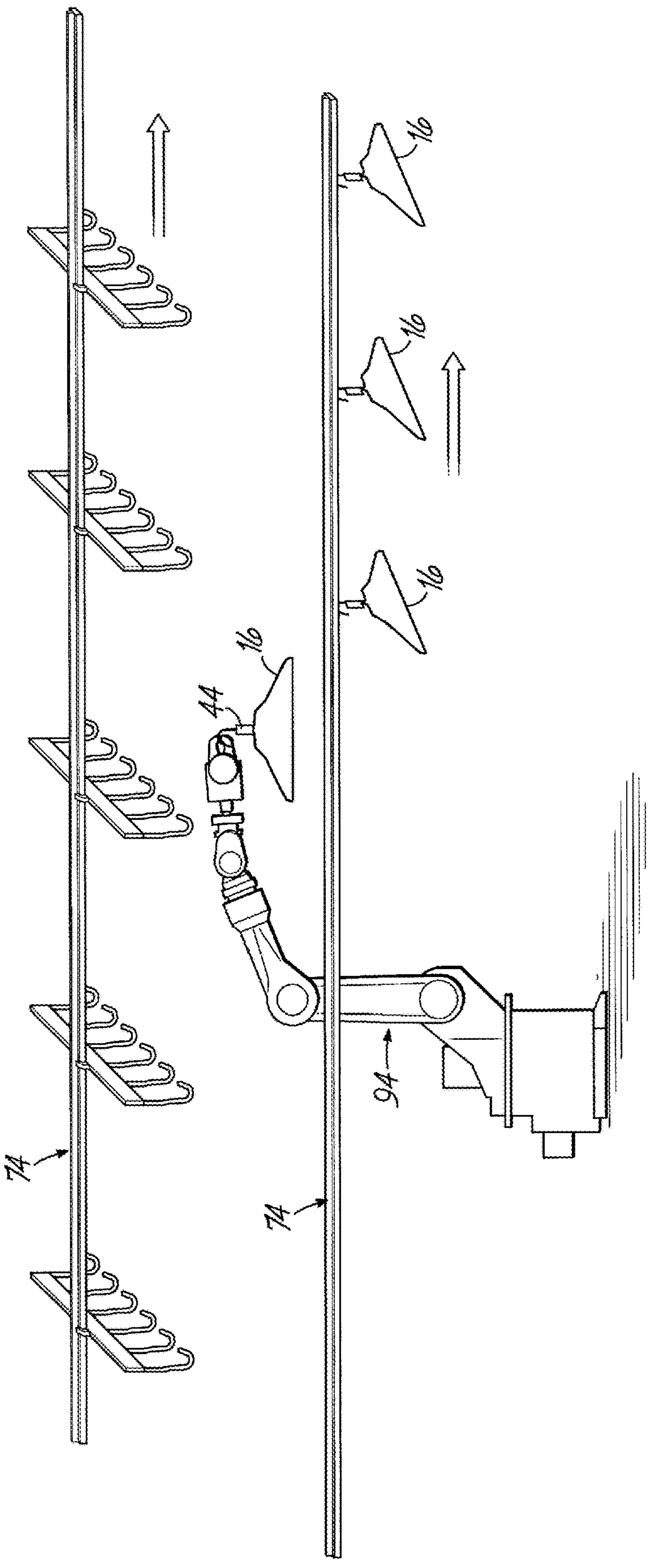
FIG. 10 is a view of a robot placing garments on the conveyor at the facility according to one embodiment.
Figure 11:
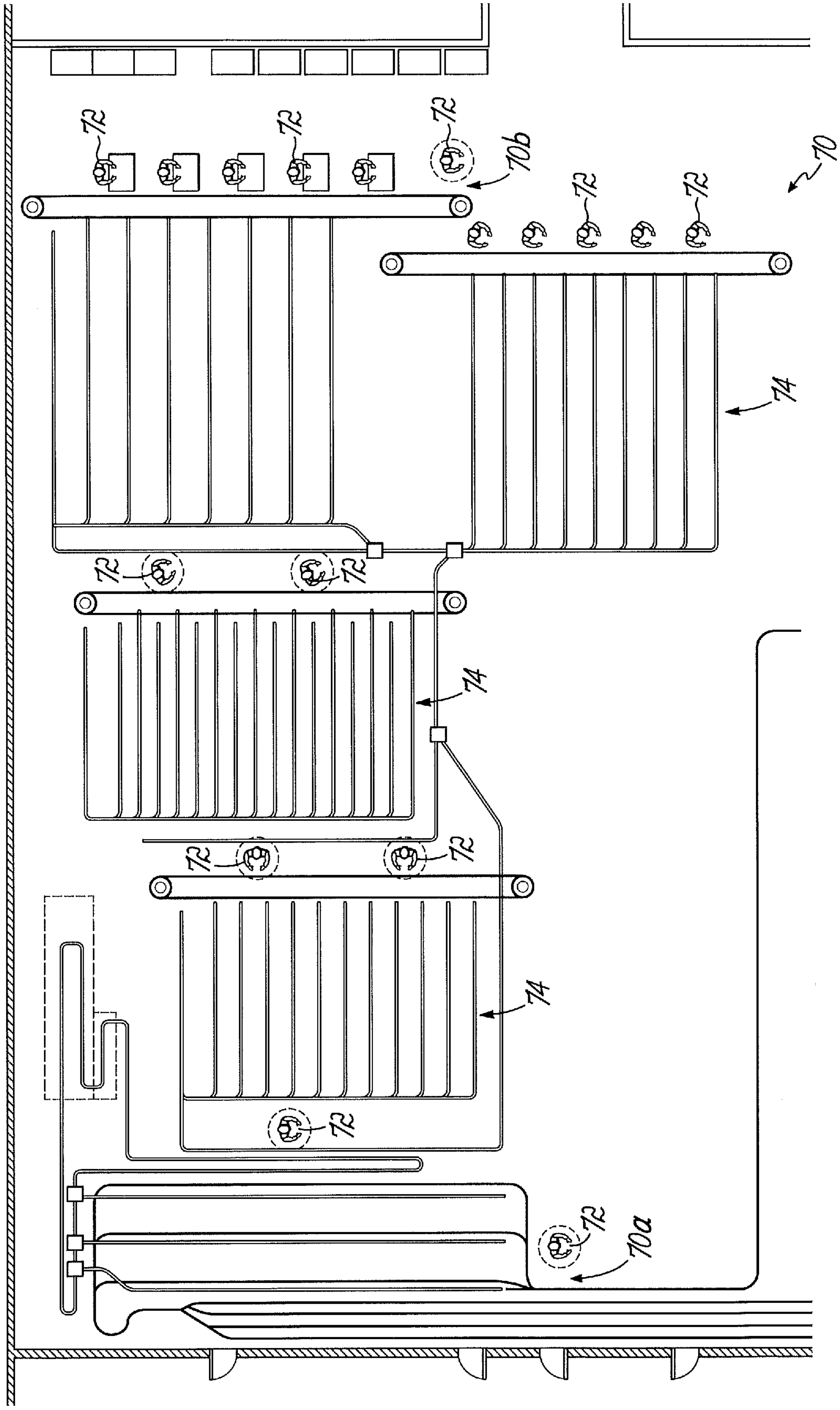
FIG. 11 is a top plan view of a sorting and processing facility showing a number of human operators required for operation of a conventional facility.

As will be appreciated with reference to FIG. 10, data read from the garment tag 12 by the reader 76 can be utilized to direct a robot 94 or currently available multiples of: switches, conveyors and rails where to put the garment 10 in the subsequent sort stations 1 thru n to the initial sort station 70*a*. The robot 94 may place the garment 10 as appropriate on any one of a variety of conveyor hooks 74*a*. This method reduces the quantity of human operators in downstream sort stations and may be implemented in conjunction with any of the readers 76 downstream from the initial sort station 70*a* in the system 70 as noted in FIGS. 12-13.

Figure 14:
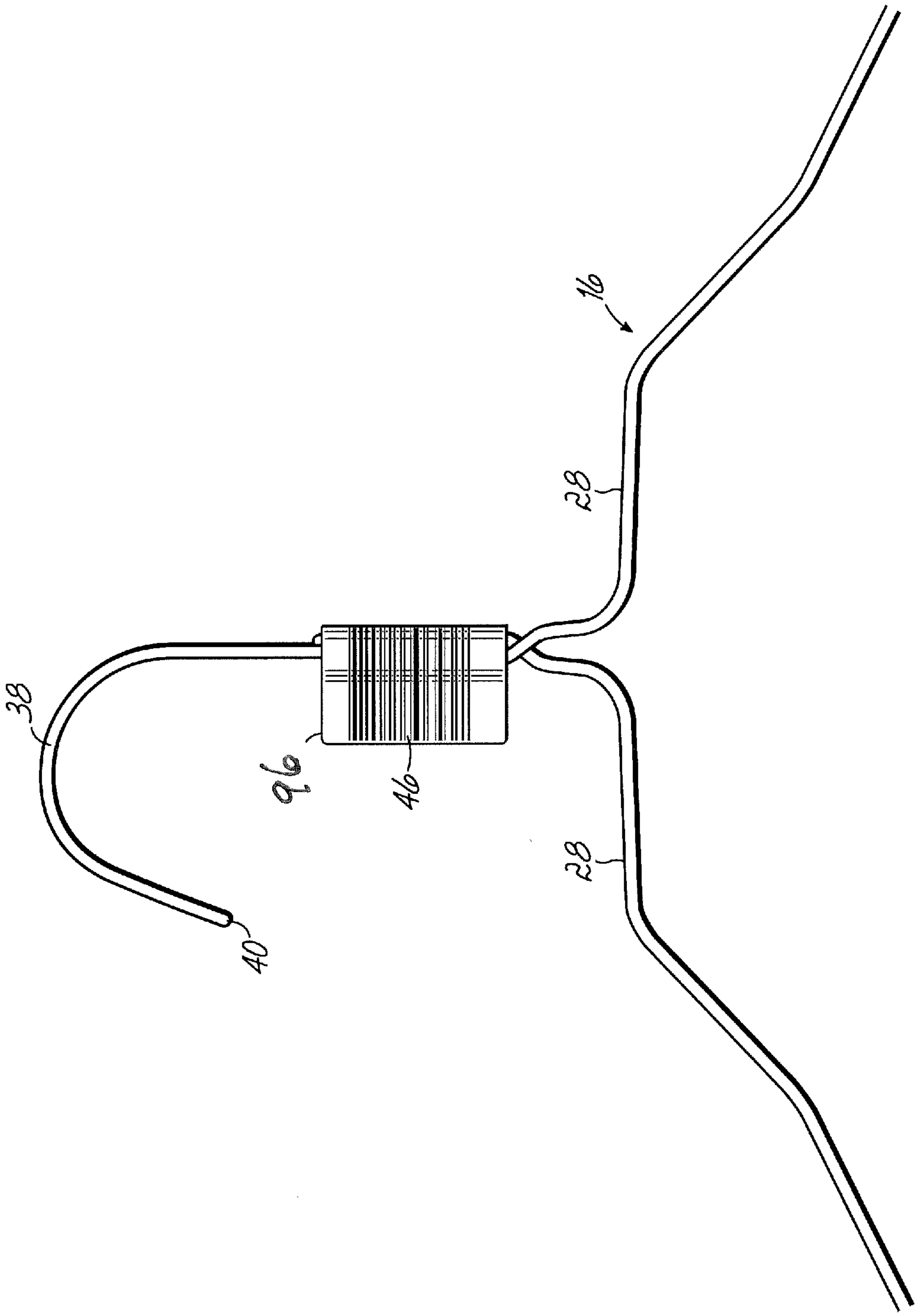
FIGS. 14-15 are front elevational and perspective views, respectively, of an alternate embodiment of a garment identification member in the form of a hanger neck sticker applied to the neck region of the hanger.
Figure 15:
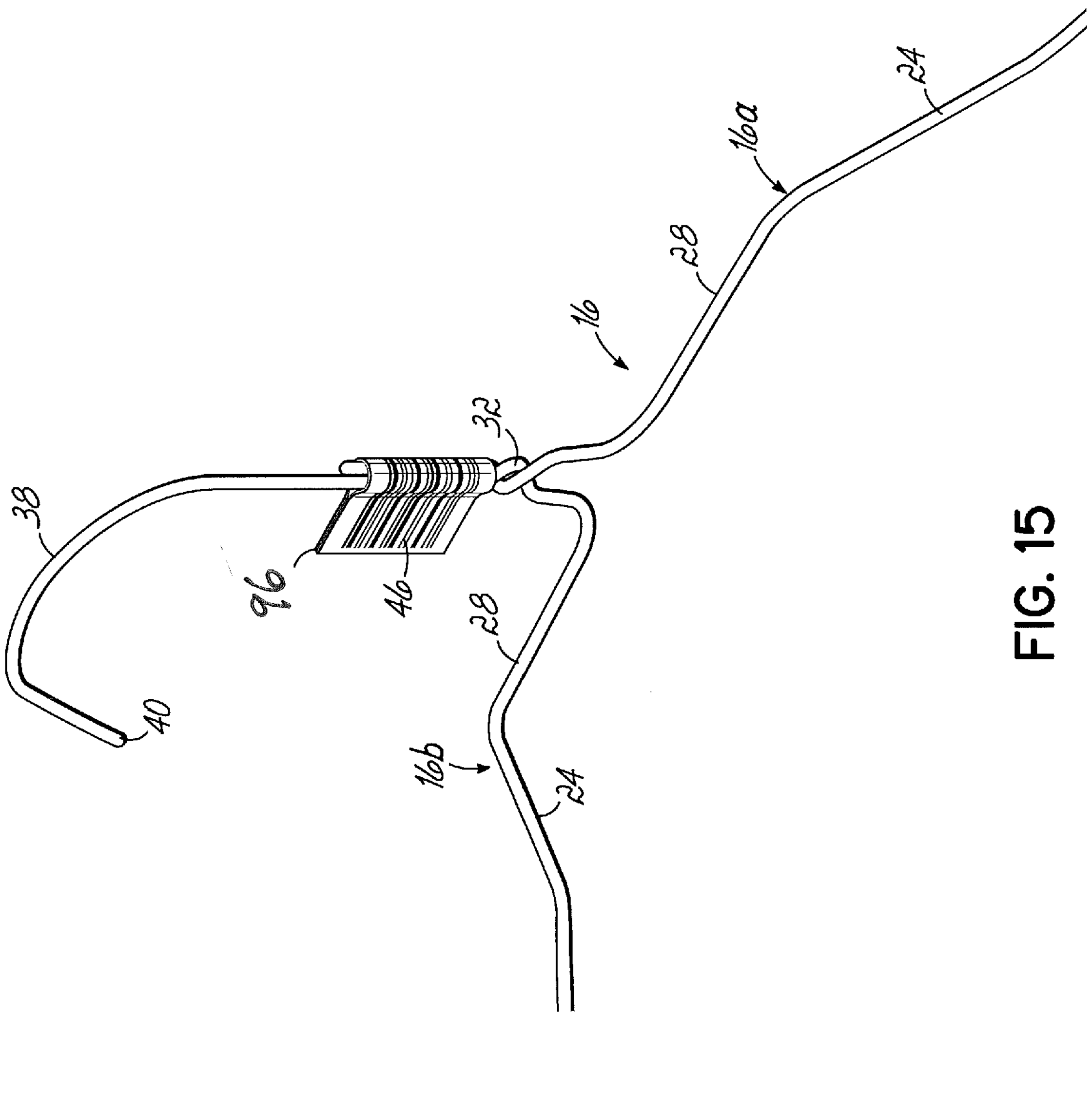

A further alternative embodiment of a garment identification member is shown in FIGS. 14-15 as a hanger neck sticker 96 having first inner and second outer faces. The first inner face may be wrapped around and secured to the neck region of the hanger 16 and a first portion of the first face may be adhered to a second portion of the first face. The second outer face bears the indicium 46.

The description of embodiments and examples has been presented for purposes of illustration and description. It is not intended to be exhaustive or limiting to the forms described. Numerous modifications are possible in light of the teachings herein. Some of those modifications have been discussed, and others will be understood by those skilled in the art. The embodiments were chosen and described in order to illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A system for processing a plurality of garments each of which is suspended on one of a plurality of hangers, each of the plurality of hangers having a hook and a neck region subjacent to the hook, the system comprising:

a plurality of garment identification members each of which is in contacting engagement with one of the hangers proximate the neck region;

a plurality of indicium each of which is on one of the plurality of garment identification members and located proximate the neck region of the associated hanger, wherein each of the plurality of indicium includes identification data to uniquely identify the associated garment on the associated hanger, wherein each of the plurality of indicium is unique in the system such that no two of the plurality of indicium in the system has the same identification data; and at least one reader positioned and adapted for reading the plurality of indicium on the plurality of garment identification members;

wherein each of the plurality of garments is suspended subjacent to the neck region of the associated one of the plurality of hangers to allow for the reader to read the plurality of indicium on the plurality of garment identification members; and wherein each of the plurality of garment identification members further comprises one of:

a hanger neck sleeve member mounted onto the neck region of the associated hanger, each hanger neck sleeve member having a generally U-shaped cross-section with a pair of spaced flanges generally parallel to each other and joined together at an arcuate bight portion of the hanger neck sleeve member, the neck region of the associated hanger being positioned between the spaced flanges, an outer face of the hanger neck sleeve member bearing the indicium; and a hanger neck sticker having first and second faces, the first face being wrapped around and secured to the neck region of the hanger and a first portion of the first face being adhered to a second portion of the first face, the second face bearing the indicium.

2. The system of claim 1 wherein the hanger neck sleeve member further comprises:

a longitudinal top end and a longitudinal bottom end; and a top notch and a bottom notch in the longitudinal top end and the longitudinal bottom end, respectively, the top notch and the bottom notch each being located proximate the bight portion and adapted to receive therein an arm of the hanger.

3. The system of claim 1 wherein the top notch is longitudinally misaligned relative to the bottom notch.

4. The system of claim 1 wherein the hanger neck sleeve member further comprises:

a first rib and a second rib each formed on one of the flanges and projecting from an inner face of the hanger neck sleeve member at a position spaced from the bight portion to thereby capture the neck region of the hanger.

5. The system of claim 1 further comprising:

a cartridge containing a first set of the plurality of garment identification members arranged serially such that a leading one of the first set is positioned for mounting on one of the hangers proximate the neck region.

6. The system of claim 1 further comprising:

a conveyor upon which each of the plurality of hangers and associated garments is suspended for movement about the system.

7. The system of claim 1 further comprising:

a plurality of garment tags each of which is on one of the plurality of garments; and a plurality of garment indicium each of which is on one of the plurality of garment tags, wherein each of the plurality of garment indicium includes garment identification data to uniquely identify the associated garment.

8. The system of claim 7 wherein the at least one reader further comprises:

a registration device located upstream within the system to read both the garment identification data on each of the garment tags and the identification data on each of the plurality of garment identification members to thereby associate the garment identification data with the identification data for the associated garment in the system.

9. The system of claim 8 wherein each of the at least one readers positioned in the system downstream from the registration device reads only the identification data on the garment identification members for each of the plurality of garments in that the garment identification data for each of the plurality of garments is associated with the identification data for the respective garment in the system.

10. A system for processing a plurality of garments each of which is suspended on one of a plurality of hangers, each of the plurality of hangers having a hook and a neck region subjacent to the hook, the system comprising:

a plurality of garment identification members each of which is in contacting engagement with one of the hangers proximate the neck region;

a plurality of indicium each of which is on one of the plurality of garment identification members and located proximate the neck region of the associated hanger, wherein each of the plurality of indicium includes identification data to uniquely identify the associated garment on the associated hanger, wherein each of the plurality of indicium is unique in the system such that no two of the plurality of indicium in the system has the same identification data; and at least one reader positioned and adapted for reading the plurality of indicium on the plurality of garment identification members;

wherein the at least one reader further comprises a registration device located upstream within the system to read both the garment identification data on each of the garment tags and the identification data on each of the plurality of garment identification members to thereby associate the garment identification data with the identification data for the associated garment in the system;

wherein each of the plurality of garments is suspended subjacent to the neck region of the associated one of the plurality of hangers to allow for the reader to read the plurality of indicium on the plurality of garment identification members;

wherein each of the plurality of garment identification members further comprises one of (a) a hanger neck sleeve member mounted onto the neck region of the associated hanger, each hanger neck sleeve member having a generally U-shaped cross-section with a pair of spaced flanges generally parallel to each other and joined together at an arcuate bight portion of the hanger neck sleeve member, the neck region of the associated hanger being positioned between the spaced flanges, an outer face of the hanger neck sleeve member bearing the indicium; and (b) a hanger neck sticker having first and second faces, the first face being wrapped around and secured to the neck region of the hanger and a first portion of the first face being adhered to a second portion of the first face, the second face bearing the indicium;

a cartridge containing a first set of the plurality of garment identification members arranged serially such that a leading one of the first set is positioned for mounting on one of the hangers proximate the neck region;

a plurality of garment tags each of which is on one of the plurality of garments; and a plurality of garment indicium each of which is on one of the plurality of garment tags, wherein each of the plurality of garment indicium includes garment identification data to uniquely identify the associated garment;

wherein each of the at least one readers positioned in the system downstream from the registration device reads only the identification data on the garment identification members for each of the plurality of garments in that the garment identification data for each of the plurality of garments is associated with the identification data for the respective garment in the system.

11. The system of claim 10 wherein the hanger neck sleeve member further comprises:

a longitudinal top end and a longitudinal bottom end; and a top notch and a bottom notch in the longitudinal top end and the longitudinal bottom end, respectively, the top notch and the bottom notch each being located proximate the bight portion and adapted to receive therein an arm of the hanger;

wherein the top notch is longitudinally misaligned relative to the bottom notch.

12. The system of claim 11 wherein the hanger neck sleeve member further comprises:

a first rib and a second rib each formed on one of the flanges and projecting from an inner face of the hanger neck sleeve member at a position spaced from the bight portion to thereby capture the neck region of the hanger.

13. A method for processing a plurality of garments each of which is suspended on one of a plurality of hangers, each of the plurality of hangers having a hook and a neck region subjacent to the hook, the method comprising the steps of:

attaching each of a plurality of garment identification members in contacting engagement with one of the plurality of hangers proximate the neck region of the associated hanger, each of the plurality of garment identification members have indicium with identification data to identify the associated garment on the associated hanger, wherein the attaching step further comprises one of:

clipping a hanger neck sleeve member onto the neck region of the associated hanger, each hanger neck sleeve member having a generally U-shaped cross-section with a pair of spaced flanges generally parallel to each other and joined together at an arcuate bight portion of the hanger neck sleeve member, the neck region of the associated hanger being positioned between the spaced flanges, an outer face of the hanger neck sleeve member bearing the indicium; and wrapping a hanger neck sticker having first and second faces around the neck region of the associated hanger, a first portion of the first face being adhered to a second portion of the first face, the second face bearing the indicium;

conveying the plurality of garments through a plurality of stations; and reading the indicium on each of the plurality of garment identification members for processing the associated garment through the plurality of stations.

14. The method of claim 13 wherein each of the plurality of garments is suspended subjacent to the neck region of the associated one of the plurality of hangers to help facilitate the reading step.

15. The method of claim 13 further comprising:

seating a notch on a longitudinal end of the hanger neck sleeve member onto an arm of the associated hanger.

16. The method of claim 13 wherein the attaching step further comprises:

dispensing a leading one a set of the plurality of hanger neck sleeve members from a cartridge containing the set of the plurality of hanger neck sleeve members.

17. The method of claim 13 wherein each of the garments has a garment tag and each garment tag has garment indicium and each of the garment indicium includes garment identification data to identify the associated garment, the method further comprising:

initially reading both the garment indicium on the garment tag and the indicium on the garment identification member of each of the plurality of garments at an upstream one of the plurality of stations to thereby associate the garment identification data with the identification data for the associated garment.

18. The method of claim 17 wherein the reading the indicium on each of the plurality of garment identification members for processing the associated garment through the plurality of stations further comprises reading only the identification data on the garment identification member for each of the plurality of garments in that the garment identification data for each of the plurality of garments is associated with the identification data for the respective garment.

* * * * *